(12) United States Patent
Itogawa

(10) Patent No.: US 11,810,726 B2
(45) Date of Patent: Nov. 7, 2023

(54) MULTILAYER CERAMIC CAPACITOR

(71) Applicant: Murata Manufacturing Co., Ltd., Nagaokakyo (JP)

(72) Inventor: Masaki Itogawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 83 days.

(21) Appl. No.: 17/511,615

(22) Filed: Oct. 27, 2021

(65) Prior Publication Data

US 2022/0148814 A1   May 12, 2022

(30) Foreign Application Priority Data

Nov. 11, 2020   (JP) ................. 2020-187978

(51) Int. Cl.
| | | |
|---|---|---|
| *H01G 4/30* | (2006.01) | |
| *H01G 4/008* | (2006.01) | |
| *H01G 4/012* | (2006.01) | |
| *H01G 4/12* | (2006.01) | |

(52) U.S. Cl.
CPC ............. *H01G 4/30* (2013.01); *H01G 4/008* (2013.01); *H01G 4/012* (2013.01); *H01G 4/1218* (2013.01)

(58) Field of Classification Search
CPC ........... H01G 4/30; H01G 4/008; H01G 2/02; H01G 4/1218; H01G 4/248; H01G 4/012; H01G 4/1209; H01G 4/232; H01G 4/0085; H01G 4/1227; H01G 4/2325; H01G 4/33
See application file for complete search history.

(56) References Cited

U.S. PATENT DOCUMENTS

| | | | | |
|---|---|---|---|---|
| 2010/0330427 A1* | 12/2010 | Kogetsu | ............... | H01M 4/661 219/137 R |
| 2012/0288731 A1 | 11/2012 | Motoki et al. | | |
| 2013/0100579 A1* | 4/2013 | Morito | ................. | H01G 4/224 361/321.2 |
| 2013/0321980 A1* | 12/2013 | Suzuki | ................. | H01G 4/30 29/25.42 |
| 2014/0126109 A1* | 5/2014 | Kim | .................... | H01G 4/012 264/618 |
| 2016/0071647 A1* | 3/2016 | Nishisaka | ........... | H01G 4/0085 361/301.4 |
| 2017/0330689 A1* | 11/2017 | Hatanaka | .............. | H01G 2/065 |
| 2018/0108481 A1* | 4/2018 | Tomizawa | .......... | H01G 4/1245 |
| 2018/0286594 A1 | 10/2018 | Kim et al. | | |
| 2019/0228911 A1* | 7/2019 | Inomata | ............ | C04B 35/4682 |

FOREIGN PATENT DOCUMENTS

| | | |
|---|---|---|
| JP | 08-306580 A | 11/1996 |
| JP | 2012-237033 A | 12/2012 |
| JP | 2013-110239 A | 6/2013 |
| JP | 2013-149886 A | 8/2013 |
| JP | 2019117942 A | 7/2019 |
| JP | 2020056056 A | 4/2020 |

OTHER PUBLICATIONS

Office Action in JP2020-187978, dated May 30, 2023, 2 pages.

* cited by examiner

*Primary Examiner* — Michael P McFadden
(74) *Attorney, Agent, or Firm* — KEATING & BENNETT, LLP

(57) ABSTRACT

A multilayer ceramic capacitor includes first and second external electrodes, each including a Ni-plated layer and a Sn-plated layer on the Ni-plated layer. The Sn-plated layer includes an intermetallic compound that penetrates the Sn-plated layer in a thickness direction, and allows hydrogen to pass therethrough more easily than Sn.

20 Claims, 15 Drawing Sheets

|  | Comparative Example |  |  |  |  | Example |  |  |  |  |
|---|---|---|---|---|---|---|---|---|---|---|
|  | CHIP A | CHIP B | CHIP C | CHIP D | CHIP E | CHIP F | CHIP G | CHIP H | CHIP I | CHIP J |
| BEFORE HIGH TEMPERATURE LOAD TEST (0h) | 6.99 | 6.97 | 6.87 | 6.97 | 7.02 | 7.01 | 6.89 | 7.11 | 7.02 | 7.00 |
| AFTER HIGH TEMPERATURE LOAD TEST (50h) | 4.79 | 4.44 | 4.52 | 4.47 | 4.61 | 6.98 | 6.85 | 7.09 | 6.88 | 3.98 |
| AFTER PEELING OFF Sn PLATING | 6.97 | 6.96 | 6.85 | 6.95 | 7.00 | 7.01 | 6.88 | 7.11 | 6.98 | 7.00 |

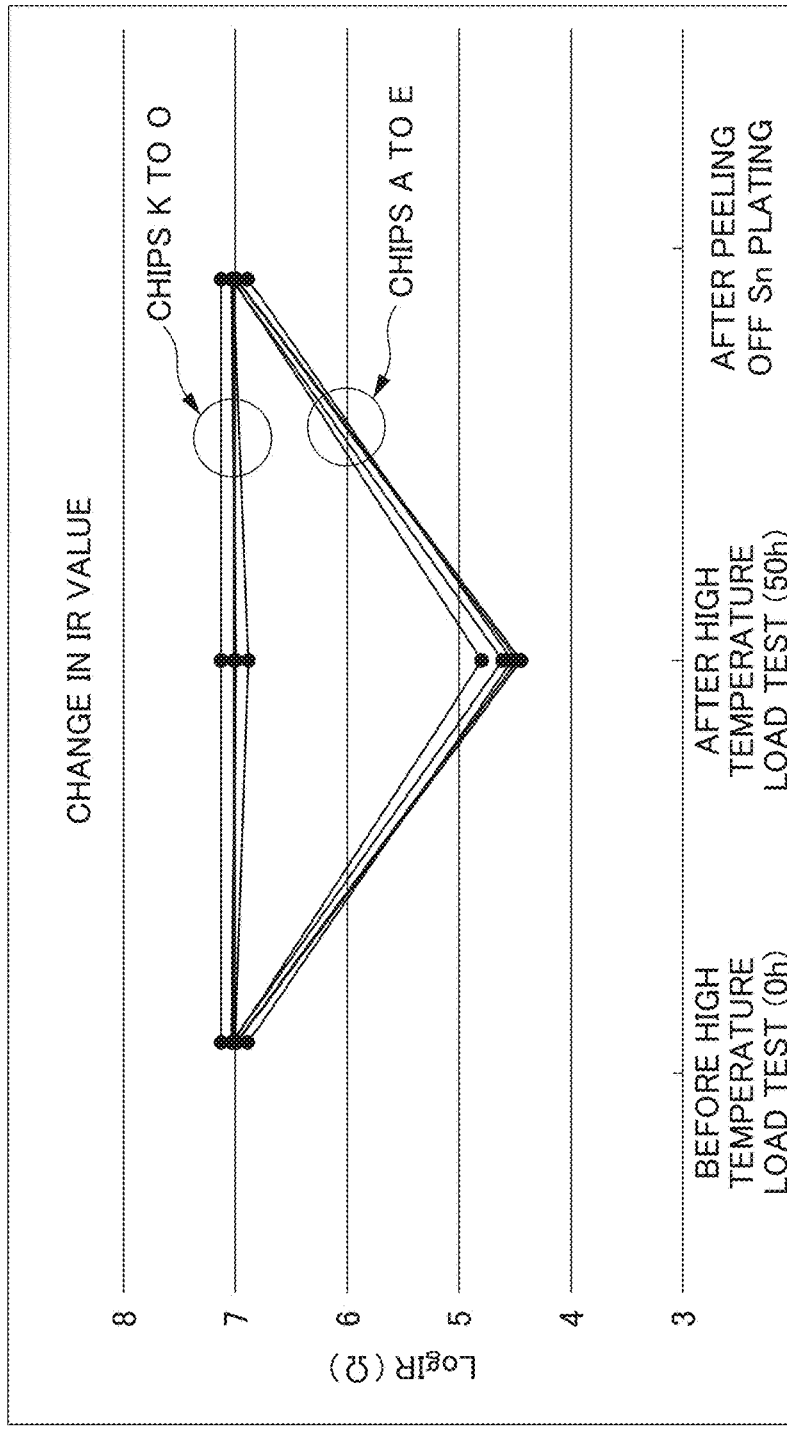

MULTILAYER CERAMIC CAPACITOR

CROSS REFERENCE TO RELATED APPLICATIONS

This application claims the benefit of priority to Japanese Patent Application No. 2020-187978 filed on Nov. 11, 2020. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known. In general, a multilayer ceramic capacitor includes a ceramic sintered body made of a dielectric ceramic such as barium titanate. Inside the ceramic sintered body, a plurality of internal electrodes are laminated with ceramic layers interposed therebetween. Furthermore, on one end surface and the other end surface of the ceramic sintered body, the external electrodes are respectively provided so as to be electrically connected to the internal electrodes. For example, Japanese Unexamined Patent Application, Publication No. H08-306580 discloses a multilayer ceramic capacitor including plated layers serving as the external electrodes. The plated layers of Japanese Unexamined Patent Application, Publication No. H08-306580 each include a Ni-plated layer for reducing or preventing soldering erosion, and a Sn-plated layer provided on the Ni-plated layer for improving the solderability.

Recently, as the plated layer of the external electrode, a dense Sn-plated layer having excellent solderability has been required. However, since the dense layer hardly permeates hydrogen, hydrogen generated during the plating remains in a state of being occluded in the Ni-plated layer. The remaining hydrogen may deteriorate the electrical characteristics of the multilayer ceramic capacitor, in particular insulation resistance characteristics (IR characteristics). Therefore, Japanese Unexamined Patent Application, Publication No. 2013-110239 discloses a configuration in which hydrogen occluded in the Ni-plated layer is reduced by providing an opening in the Sn layer provided on the Ni-plated layer. However, in the structure of Japanese Unexamined Patent Application, Publication No. 2013-110239, since the Sn layer includes the opening, moisture may enter the capacitor therethrough.

SUMMARY OF THE INVENTION

Preferred embodiments of the present invention provide multilayer ceramic capacitors that are each able to reduce or prevent a decrease in insulation resistance characteristics, while reducing or preventing moisture infiltration into the capacitor.

A preferred embodiment of the present invention provides a multilayer ceramic capacitor that includes a multilayer body including a plurality of laminated dielectric layers, the multilayer body further including a first main surface and a second main surface opposing each other in a height direction, a first side surface and a second side surface opposing each other in a width direction perpendicular or substantially perpendicular to the height direction, and a first end surface and a second end surface opposing each other in a length direction perpendicular or substantially perpendicular to the height direction and the width direction, first internal electrode layers on the plurality of dielectric layers and exposed at the first end surface, second internal electrode layers on the plurality of dielectric layers and exposed at the second end surface, a first external electrode connected to the first internal electrode layers and provided on the first end surface, and a second external electrode connected to the second internal electrode layers and provided on the second end surface, wherein the first external electrode and the second external electrode each include a Ni-plated layer and a Sn-plated layer on the Ni-plated layer, and the Sn-plated layer includes an intermetallic compound that penetrates through the Sn-plated layer in a thickness direction and allows hydrogen to pass therethrough more easily than Sn.

According to preferred embodiments of the present invention, it is possible to provide multilayer ceramic capacitors that are each able to reduce or prevent a decrease in insulation resistance characteristics, while reducing or preventing moisture infiltration into the capacitor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13 is a diagram showing the results of evaluation tests of IR in second experimental examples of a preferred embodiment of the present invention.

DETAILED DESCRIPTION OF THE PREFERRED EMBODIMENTS

Preferred embodiments of the present invention will be described in detail with reference to the accompanying drawings.

First Preferred Embodiment

Figure 1:
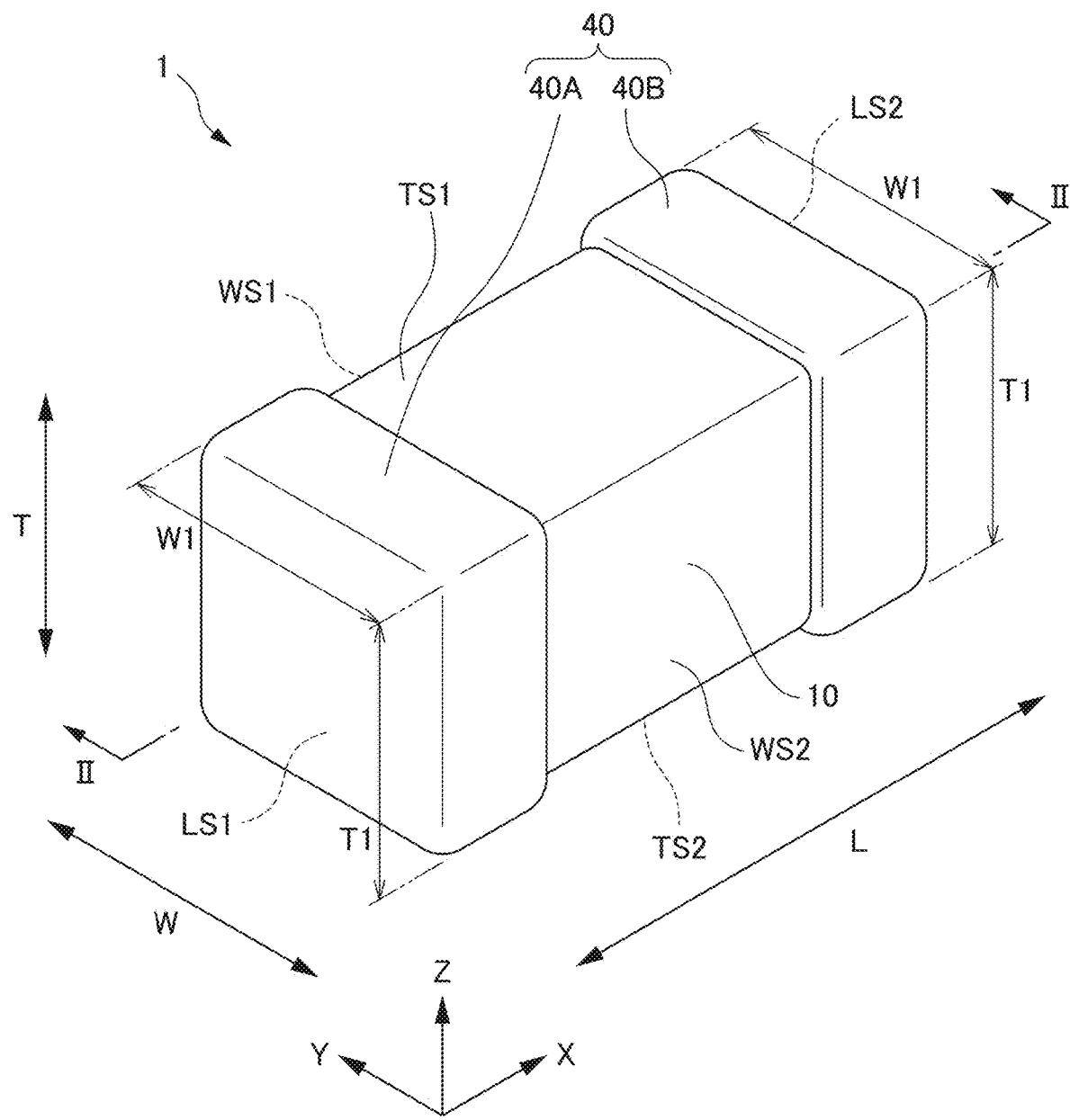
FIG. 1 is an external perspective view of a multilayer ceramic capacitor according to a first preferred embodiment of the present invention.
Figure 2:
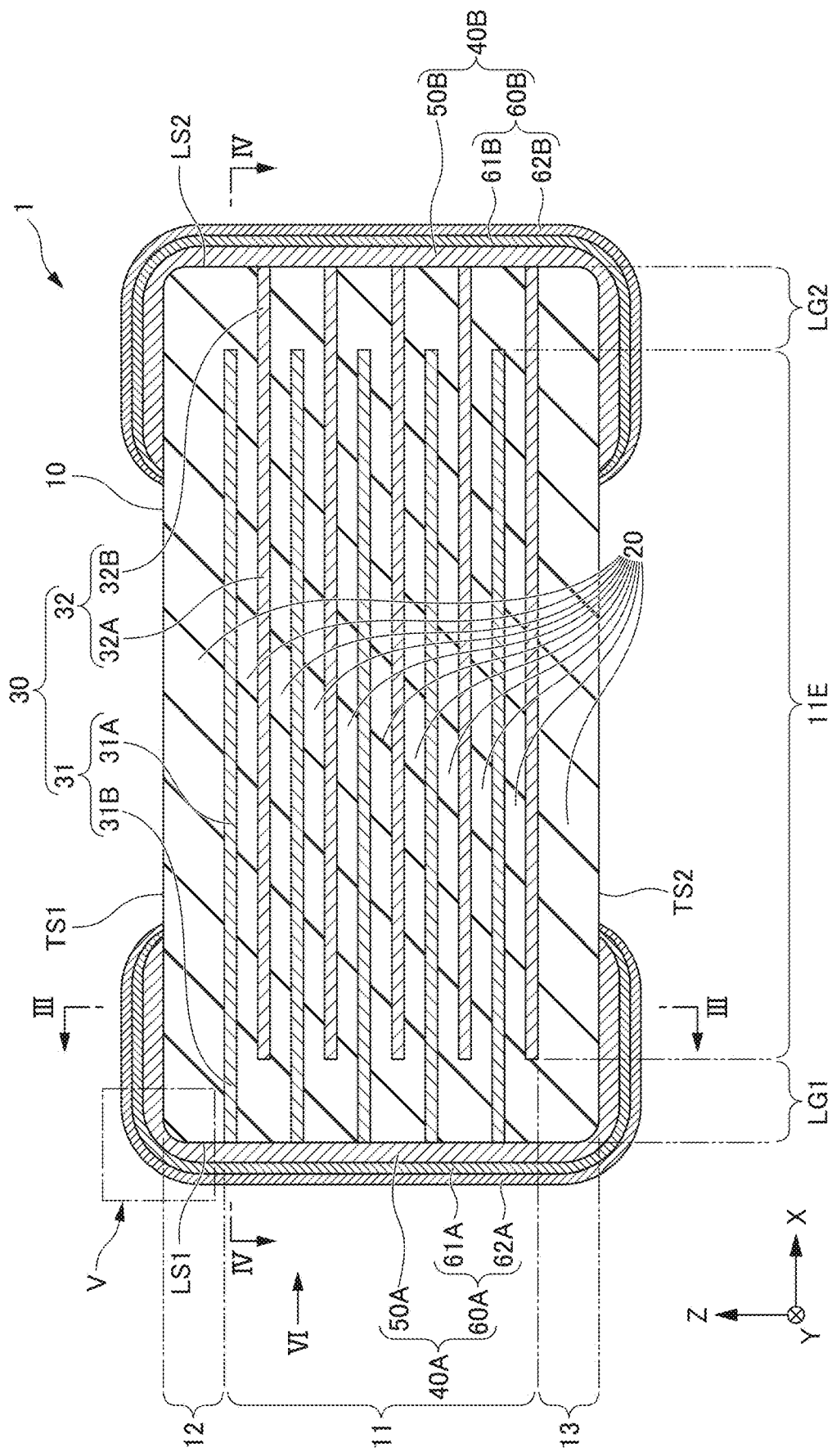
FIG. 2 is a cross-sectional view taken along the line II-II of the multilayer ceramic capacitor shown in FIG. 1.
Figure 3:
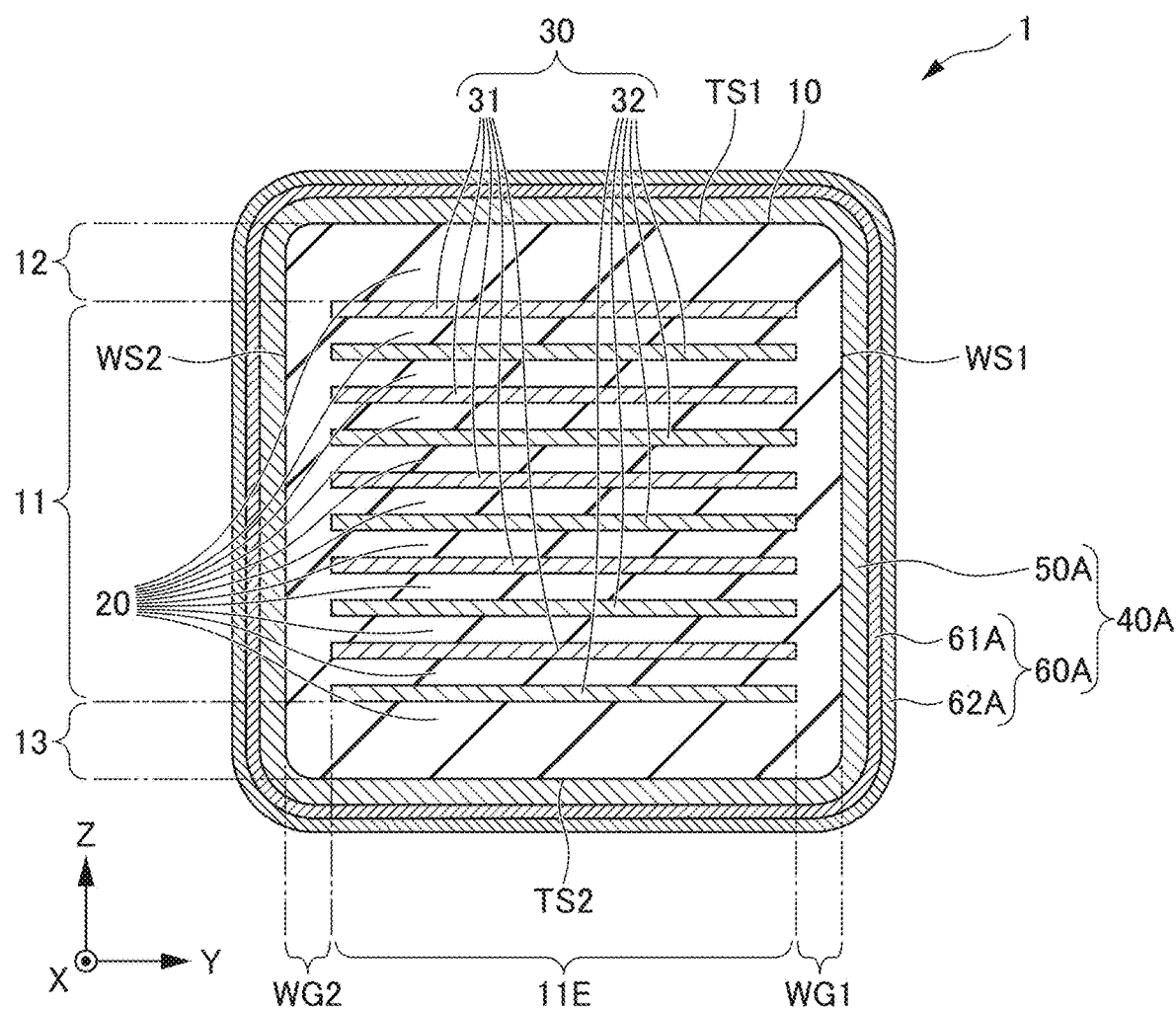
FIG. 3 is a cross-sectional view taken along the line of the multilayer ceramic capacitor shown in FIG. 2.
Figure 4:
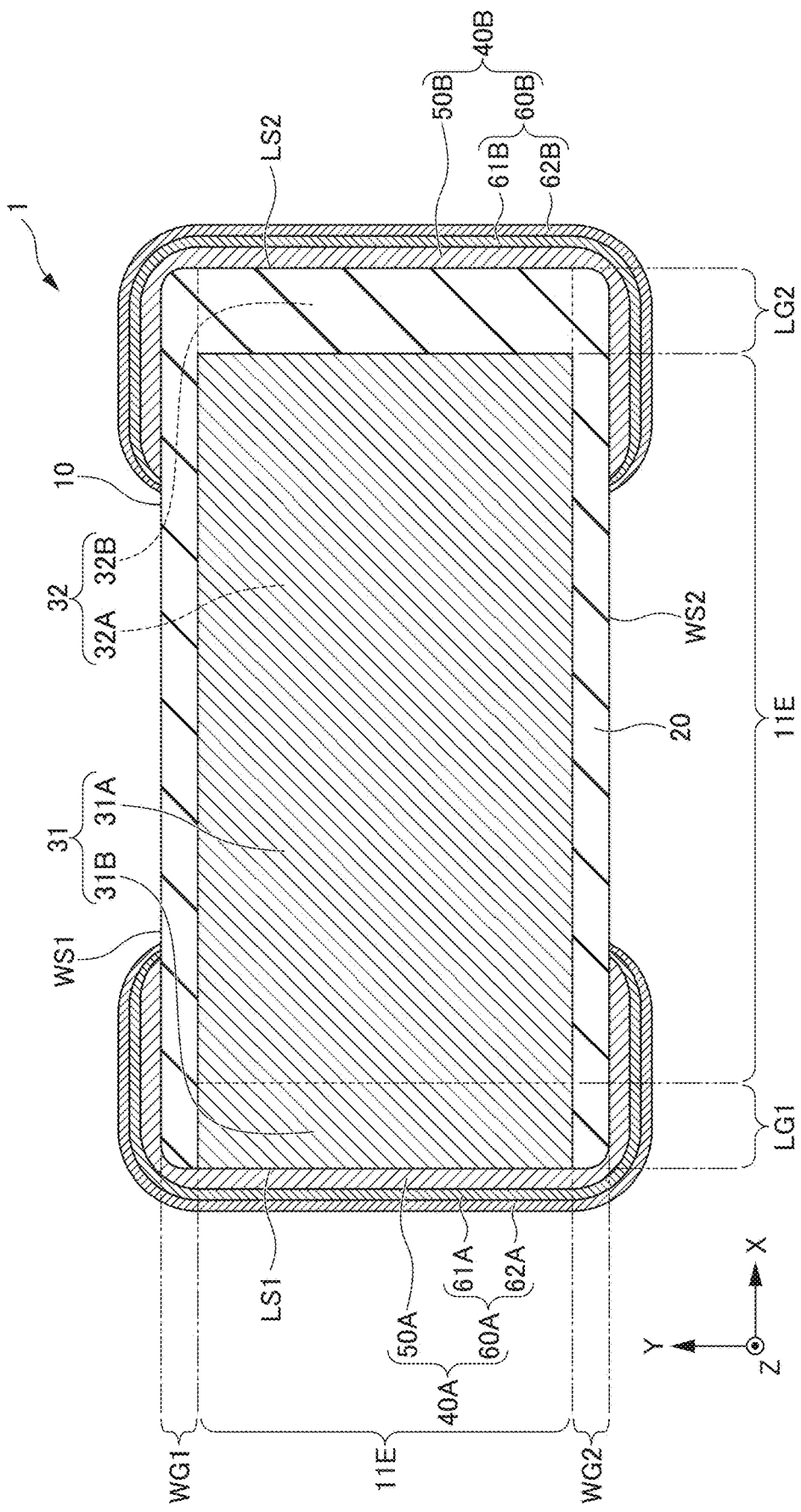
FIG. 4 is a cross-sectional view taken along the line IV-IV of the multilayer ceramic capacitor shown in FIG. 2.
Figure 5:
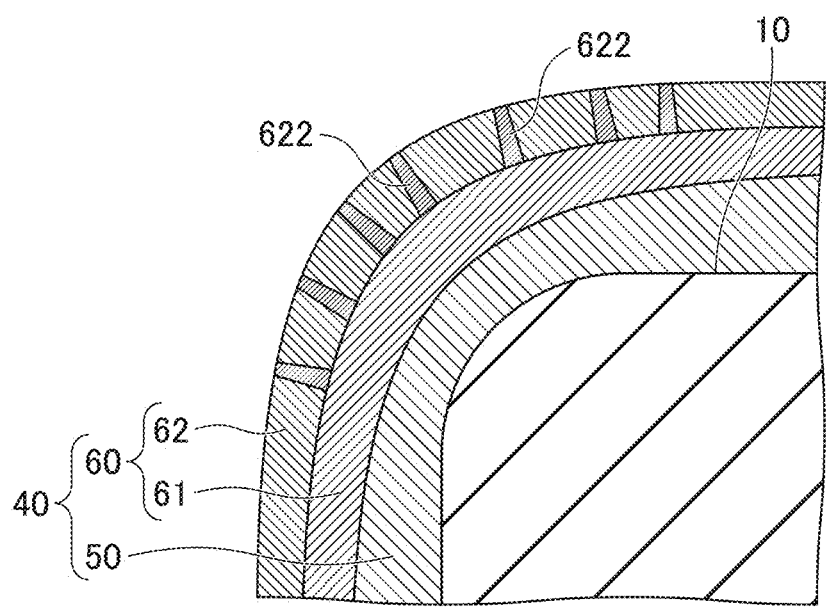
FIG. 5 is an enlarged view of a V portion of the multilayer ceramic capacitor shown in FIG. 2, and is an enlarged cross-sectional view schematically showing a cross section of an external electrode.
Figure 6:
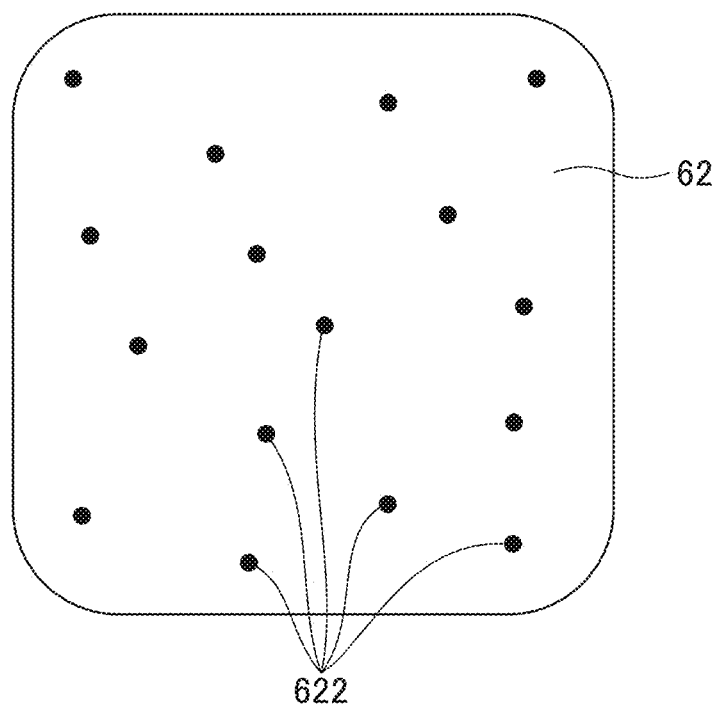
FIG. 6 is a view of the multilayer ceramic capacitor shown in FIG. 2 when viewed in the direction of an arrow VI, and schematically shows a surface of the external electrode.

Hereinafter, a multilayer ceramic capacitor 1 according to a first preferred embodiment of the present disclosure will be described. FIG. 1 is an external perspective view of a multilayer ceramic capacitor 1 according to a preferred embodiment. FIG. 2 is a cross-sectional view taken along the line II-II of the multilayer ceramic capacitor 1 shown in FIG. 1. FIG. 3 is a cross-sectional view taken along the line of the multilayer ceramic capacitor 1 shown in FIG. 2. FIG. 4 is a cross-sectional view taken along the line IV-IV of the multilayer ceramic capacitor 1 shown in FIG. 2. FIG. 5 is an enlarged view of a V portion of the multilayer ceramic capacitor shown in FIG. 2, and is an enlarged cross-sectional view schematically showing a cross section of an external electrode. FIG. 6 is a view of the multilayer ceramic capacitor shown in FIG. 2 when viewed in the direction of an arrow VI, and schematically shows a surface of the external electrode.

The multilayer ceramic capacitor 1 includes a multilayer body 10 and external electrodes 40.

The XYZ Cartesian coordinate system is shown in FIGS. 1 to 4. A length direction L of the multilayer ceramic capacitor 1 and the multilayer body 10 corresponds to the X direction. A width direction W of the multilayer ceramic capacitor 1 and the multilayer body 10 corresponds to the Y direction. A height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIG. 4 is also referred to as an LW cross section.

As shown in FIGS. 1 to 4, the multilayer body 10 includes a first main surface TS1 and a second main surface TS2 opposing each other in the height direction T, a first side surface WS1 and a second side surface WS2 opposing each other in the width direction W perpendicular or substantially perpendicular to the height direction T, and a first end surface LS1 and a second end surface LS2 opposing each other in the length direction L perpendicular or substantially perpendicular to the height direction T and the width direction W.

As shown in FIG. 1, the multilayer body 10 has a rectangular or substantially rectangular parallelepiped shape. The dimension of the multilayer body 10 in the length direction L is not necessarily longer than the dimension of the width direction W. The corners and ridges of the multilayer body 10 are preferably rounded. The corners are portions where the three surfaces of the multilayer body intersect, and the ridges are portions where the two surfaces of the multilayer body intersect. It should be noted that unevenness or the like may be provided on a portion or the entirety of the surface of the multilayer body 10.

The dimension of the multilayer body 10 is not particularly limited. However, for example, when the dimension in the length direction L of the multilayer body 10 is defined as an L dimension, the L dimension is preferably about 0.2 mm or more and about 10 mm or less. Furthermore, when the dimension in the height direction T of the multilayer body 10 is defined as a T dimension, the T dimension is preferably about 0.1 mm or more and about 10 mm or less, for example. Furthermore, when the dimension in the width direction W of the multilayer body 10 is defined as a W dimension, the W dimension is preferably about 0.1 mm or more and about 5 mm or less, for example.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30. The inner layer portion 11 includes, in the height direction T, from the internal electrode layer 30 located closest to the first main surface TS1 to the internal electrode layer 30 located closest to the second main surface TS2. In the inner layer portion 11, a plurality of internal electrode layers 30 are opposed to each other with the dielectric layer 20 interposed therebetween. The inner layer portion 11 generates a capacitance and substantially defines and functions as a capacitor.

The plurality of dielectric layers 20 are each made of a dielectric material. The dielectric material may be a dielectric ceramic including, for example, a component such as $BaTiO_3$, $CaTiO_3$, $SrTiO_3$, or $CaZrO_3$. Furthermore, the dielectric material may be obtained by adding a secondary component such as, for example, a Mn compound, an Fe compound, a Cr compound, a Co compound, or a Ni compound to the main component.

The thicknesses of the dielectric layers 20 are each preferably about 0.8 μm or more and about 10 μm or less, for example. The number of the dielectric layers 20 to be laminated (stacked) is preferably fifteen or more and 800 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 each include a first internal electrode layer 31 and a second internal electrode layer 32. The plurality of first internal electrode layers 31 are each provided on the dielectric layer 20. The plurality of second internal electrode layers 32 are each provided on the second dielectric layer 20. The plurality of first internal electrode layers 31 and the plurality of second internal electrode layers 32 are alternately provided in the height direction T of the multilayer body 10 with the dielectric layers 20 interposed therebetween. The first internal electrode layers 31 and the second internal electrode layers 32 each sandwich the dielectric layers 20.

The first internal electrode layer 31 includes a first opposing portion 31A facing the second internal electrode layer 32, and a first lead-out portion 31B extending from the first opposing portion 31A to the first end surface LS1. The first lead-out portion 31B is exposed at the first end surface LS1.

The second internal electrode layer 32 includes a second opposing portion 32A facing the first internal electrode layer 31, and a second lead-out portion 32B extending from the second opposing portion 32A to the second end surface LS2. The second lead-out portion 32B is exposed at the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited. However, they are preferably rectangular or substantially rectangular. The corners of the rectangular or substantially rectangular shape may be rounded, or the corners of the rectangular or substantially rectangular shape may be provided obliquely. The shapes of the first lead-out portion 31B and the second lead-out portion 32B are not particularly limited. However, they are preferably rectangular or substantially rectangular. However, the corners of the rectangular shape may be rounded, or the corners of the rectangular shape may be provided obliquely.

The dimension in the width direction W of the first opposing portion 31A may be the same or substantially the same as the dimension in the width direction W of the first lead-out portion 31B, or either of them may be smaller. The dimension in the width direction W of the second opposing portion 32A may be the same or substantially the same as the dimension in the width direction W of the second lead-out portion 32B, or either of them may be smaller.

The first internal electrode layer 31 and the second internal electrode layer 32 are each made of an appropriate conductive material including a metal such as, for example, Ni, Cu, Ag, Pd, and Au, and an alloy including at least one of these metals. When using an alloy, the first internal electrode layer 31 and the second internal electrode layer 32 may be made of, for example, a Ag—Pd alloy or the like.

The thickness of each of the first internal electrode layers 31 and the second internal electrode layers 32 is preferably, for example, about 0.2 µm or more and about 2.0 µm or less. The total number of the first internal electrode layers 31 and the second internal electrode layers 32 is preferably fifteen or more and 800 or less, for example.

The first main surface-side outer layer portion 12 is located in the vicinity of the first main surface TS1 of the multilayer body 10. The first main surface-side outer layer portion 12 is an assembly of a plurality of dielectric layers 20 located between the first main surface TS1 and the internal electrode layer 30 closest to the first main surface TS1. The dielectric layers 20 used in the first main surface-side outer layer portion 12 may be the same or substantially the same as the dielectric layers 20 used in the inner layer portion 11.

The second main surface-side outer layer portion 13 is located in the vicinity of the second main surface TS2 of the multilayer body 10. The second main surface-side outer layer portion 13 is an assembly of a plurality of dielectric layers 20 located between the second main surface TS2 and the internal electrode layer 30 closest to the second main surface TS2. The dielectric layers 20 used in the second main surface-side outer layer portion 13 may be the same as the dielectric layers 20 used in the inner layer portion 11.

The multilayer body 10 includes a counter electrode portion 11E. The counter electrode portion 11E refers to a portion where the first opposing portion 31A of the first internal electrode layer 31 and the second opposing portion 32A of the second internal electrode layer 32 face each other. The counter electrode portion 11E defines and functions as a portion of the inner layer portion 11. FIG. 4 shows the range of the counter electrode portion 11E in the width direction W and in the length direction L. The counter electrode portion 11E is also referred to as a capacitor active portion.

The multilayer body 10 includes side surface-side outer layer portions WG. The side surface-side outer layer portions WG include a first side surface-side outer layer portion WG1 and a second side surface-side outer layer portion WG2. The first side surface-side outer layer portion WG1 is a portion including the dielectric layer 20 located between the counter electrode portion 11E and the first side surface WS1. The second side surface-side outer layer portion WG2 is a portion including the dielectric layer 20 located between the counter electrode portion 11E and the second side surface WS2. FIGS. 3 and 4 each show the ranges of the first side surface-side outer layer portion WG1 and the second side surface-side outer layer portion WG2 in the width direction W. The side surface-side outer layer portions WG are also each referred to as a W gap or a side gap.

The multilayer body 10 includes end surface-side outer layer portions LG. The end surface-side outer layer portions LG include a first end surface-side outer layer portion LG1 and a second end surface-side outer layer portion LG2. The first end surface-side outer layer portion LG1 is a portion including the dielectric layer 20 located between the counter electrode portion 11E and the first end surface LS1. The second end surface-side outer layer portion LG2 is a portion including the dielectric layer 20 located between the counter electrode portion 11E and the second end surface LS2. FIGS. 2 and 4 show the ranges in the length directions L of the first end surface side outer layer portion LG1 and the second end surface side outer layer portion LG2. The end surface-side outer layer portion LG is also each referred to as an L gap or an end gap.

The external electrodes 40 include a first external electrode 40A provided in the vicinity of the first end surface LS1 and a second external electrode 40B provided in the vicinity of the second end surface LS2.

The first external electrode 40A is provided on the first end surface LS1. The first external electrode 40A is connected to the first internal electrode layer 31. The first external electrode 40A may be provided on a portion of the first main surface TS1 and a portion of the second main surface TS2, and also on a portion of the first side surface WS1 and a portion of the second side surface WS2. In the present preferred embodiment, the first external electrode 40A extends from the first end surface LS1 to a portion of the first main surface TS1 and to a portion of the second main surface TS2, and to a portion of the first side surface WS1 and to a portion of the second side surface WS2.

The second external electrode 40B is provided on the second end surface LS2. The second external electrode 40B is connected to the second internal electrode layers 32. The second external electrodes 40B may be provided on a portion of the first main surface TS1 and a portion of the second main surface TS2, and also on a portion of the first side surface WS1 and a portion of the second side surface WS2. In the present preferred embodiment, the second external electrode 40B extends from the second end surface LS2 to a portion of the first main surface TS1 and to a portion of the second main surface TS2, and to a portion of the first side surface WS1 and a portion of the second side surface WS2.

As described above, in the multilayer body 10, the capacitance is generated by the first opposing portions 31A of the first internal electrode layers 31 and the second opposing portions 32A of the second internal electrode layers 32 opposing each other with the dielectric layers 20 interposed therebetween. Therefore, characteristics of the capacitor are generated between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layers 31. In the present preferred embodiment, the first base electrode layer 50A extends from the first end surface LS1 to a portion of the first main surface TS1 and to a portion of the second main surface TS2, and to a portion of the first side surface WS1 and to a portion of the second side surface WS2.

The second base electrode layer 50B is provided on the second end surface LS2. The second base electrode layer 50B is connected to the second internal electrode layers 32. In the present preferred embodiment, the second base electrode layer 50B extends from the second end surface LS2 to a portion of the first main surface TS1 and to a portion of the second main surface TS2, and to a portion of the first side surface WS1 and to a portion of the second side surface WS2.

The first base electrode layer 50A and the second base electrode layer 50B include, for example, at least one selected from a fired layer, a conductive resin layer, a thin film layer, and the like.

The first base electrode layer 50A and the second base electrode layer 50B of the present preferred embodiment are fired layers. It is preferable that the fired layers each include both a metal component, and either a glass component or a ceramic component, or both the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. As the ceramic component, the same ceramic material as that of the dielectric layer 20 may be used, or a differently ceramic material may be used. Ceramic components include, for example, at least one selected from $BaTiO_3$, $CaTiO_3$, (Ba, Ca)$TiO_3$, $SrTiO_3$, $CaZrO_3$, and the like.

The fired layer is obtained by, for example, applying a conductive paste including glass and metal to a multilayer body and firing it. The fired layer may be obtained by simultaneously firing a laminate chip including the internal electrodes and the dielectric layers and a conductive paste applied to the laminate chip, or obtained by firing the laminate chip including the internal electrodes and the dielectric layers to obtain a multilayer body, following which the multilayer body is coated with a conductive paste, and subjected to firing. In a case of simultaneously firing the laminate chip including the internal electrodes and the dielectric layers, it is preferable that the fired layer is formed by firing a material to which a ceramic material instead of glass component is added. In this case, it is particularly preferable to use, as the ceramic material to be added, the same type of ceramic material as the dielectric layer 20. Furthermore, the fired layer may include a plurality of layers.

The thickness in the length direction of the first base electrode layer 50A located in the vicinity of the first end surface LS1 is preferably, for example, about 3 µm or more and about 160 µm or less at the middle portion in the height direction T and the width direction W of the first base electrode layer 50A.

The thickness in the length direction s of the second base electrode layer 50B located in the vicinity of the second end surface LS2 is preferably, for example, about 3 µm or more and about 160 µm or less at the middle portion of the height direction T and the width direction W of the second base electrode layer 50B.

When providing the first base electrode layer 50A to at least one of portions of the first main surface TS1 and the second main surface TS2, the thickness in the height direction of the first base electrode layer 50A provided at this portion is preferably about 3 µm or more and about 40 µm or less at the middle portion in the length direction L and the width direction W of the first base electrode layer 50A provided at this portion, for example.

When providing the first base electrode layer 50A to at least one of portions of the first side surface WS1 and the second side surface WS2, the thickness in the width direction of the first base electrode layer 50A provided at this portion is preferably about 3 µm or more and about 40 µm or less at the middle portion in the length direction L and the height direction T of the first base electrode layer 50A provided at this portion, for example.

When providing the second base electrode layer 50B to at least one of portions of the first main surface TS1 and the second main surface TS2, the thickness in the height direction of the second base electrode layer 50B provided at this portion is preferably about 3 µm or more and about 40 µm or less at the middle portion in the length direction L and the width direction W of the second base electrode layer 50B provided at this portion, for example.

When providing the second base electrode layer 50B to at least one of portions of the first side surface WS1 and the second side surface WS2, the thickness in the width direction of the second base electrode layer 50B provided at this portion is preferably about 3 µm or more and about 40 µm or less at the middle portion in the length direction L and the height direction T of the second base electrode layer 50B provided at this portion, for example.

The first base electrode layer 50A and the second base electrode layer 50B are not limited to the fired layers, and each may be a thin film layer. The thin film layer is formed by a thin film forming method such as a sputtering method or a deposition method, for example. The thin film layer is, for example, a layer of about 1 µm or less on which metal particles are deposited.

The first plated layer 60A covers the first base electrode layer 50A. The first plated layer 60A includes a first Ni-plated layer 61A, and a first Sn-plated layer 62A provided on the first Ni-plated layer 61A.

The second plated layer 60B covers the second base electrode layer 50B. The second plated layer 60B includes a second Ni-plated layer 61B, and a second Sn-plated layer 62B provided on the second Ni-plated layer 61B.

The Ni-plated layer prevents the first base electrode layer 50A and the second base electrode layer 50B from being eroded by solder when mounting the multilayer ceramic capacitor 1. Furthermore, the Sn-plated layer improves the wettability of the solder when mounting the multilayer ceramic capacitor 1. This facilitates the mounting of the multilayer ceramic capacitor 1. The thickness of each of the Ni-plated layer and the Sn-plated layer is preferably about 1 µm or more and about 15 µm or less, for example.

Here, the basic configurations of each layer of the first external electrode 40A and the second external electrode 40B are the same or substantially the same. Furthermore, the first external electrode 40A and the second external electrode 40B are plane symmetric or substantially plane symmetric with respect to the WT cross-section at the middle in the length direction L of the multilayer ceramic capacitor 1. Therefore, in a case in which it is not necessary to particularly distinguish between the first external electrode 40A and the second external electrode 40B, the first external electrode 40A and the second external electrode 40B may be collectively referred to as an external electrode 40. The same applies to the respective layers of the first external electrode 40A and the second external electrode 40B. For example, in a case in which it is not necessary to particularly distinguish between the first base electrode layer 50A and the second base electrode layer 50B, the first base electrode layer 50A and the second base electrode layer 50B may be collectively referred to as a base electrode layer 50. Furthermore, in a case in which it is not necessary to particularly distinguish between the first plated layer 60A and the second plated layer 60B, the first plated layer 60A and the second plated layer 60B may be collectively referred to as a plated layer 60. Furthermore, in a case in which it is not necessary to particularly distinguish between the first Ni-plated layer 61A and the second Ni-plated layer 61B, the first Ni-plated layer 61A and the second Ni-plated layer 61B may be collectively referred to as a Ni-plated layer 61. Furthermore, in a case in which it is not necessary to particularly distinguish between the first Sn-plated layer 62A and the second Sn-plated layer 62B, the first Sn-plated layer 62A and the second Sn-plated layer 62B may be collectively referred to as a Sn-plated layer 62.

FIG. 5 is an enlarged view of the V portion of the multilayer ceramic capacitor 1 shown in FIG. 2, and is an enlarged cross-sectional view schematically showing a cross section of the external electrode 40. FIG. 6 is a view of the multilayer ceramic capacitor 1 shown in FIG. 2 when viewed in the direction of an arrow VI, and schematically shows a surface of the external electrode 40. As described above, the basic configurations of the first external electrode 40A and the second external electrode 40B are the same or substantially the same. Therefore, in the following explanation using FIG. 5, for example, the first external electrode 40A and the second external electrode 40B are described as the external electrode 40. The same applies to the respective layers of the first external electrode 40A and the second external electrode 40B.

As shown in FIG. 5, the base electrode layer 50 is provided on the multilayer body 10. Furthermore, the plated layer covers the base electrode layer 50. The plated layer 60 includes the Ni-plated layer 61 and the Sn-plated layer 62. FIG. 6 is a diagram showing a surface of the Ni-plated layer 61 provided on the end surface of the multilayer ceramic capacitor 1.

As shown in FIGS. 5 and 6, the external electrode 40 includes intermetallic compounds 622 that penetrate through the Sn-plated layer 62 in the thickness direction and allow hydrogen to pass therethrough more easily than Sn. More specifically, each of the intermetallic compounds 622 that allow hydrogen to pass therethrough more easily than Sn extends from the surface of the Ni-plated layer 61 to the outer surface of the Sn-plated layer 62 in the Sn-plated layer 62. For example, the shape of the intermetallic compound 622 that allows hydrogen to pass therethrough more easily than Sn is preferably a needle shape which is continuous from the surface of the Ni-plated layer 61 to the outer surface of the Sn-plated layer 62. As shown in FIGS. 5 and 6, the plurality of intermetallic compounds 622 that allow hydrogen to pass therethrough more easily than Sn are provided to define and function as penetrating portions each penetrating through the Sn-plated layer 62 in the thickness direction. The intermetallic compound 622 that allows hydrogen to pass therethrough more easily than Sn each define and function as a hydrogen permeation portion to permeate hydrogen from the surface of the Ni-plated layer 61 to the outer surface of the Sn-plated layer 62. Therefore, hydrogen generated during plating and occluded in the Ni-plated layer 61 is released to the outer surface of the multilayer ceramic capacitor through the hydrogen permeation portion formed by the intermetallic compound 622 that allows hydrogen to pass therethrough more easily than Sn. Thus, deterioration of the insulation resistance characteristics of the multilayer ceramic capacitor 1 is reduced or prevented.

Figure 7:
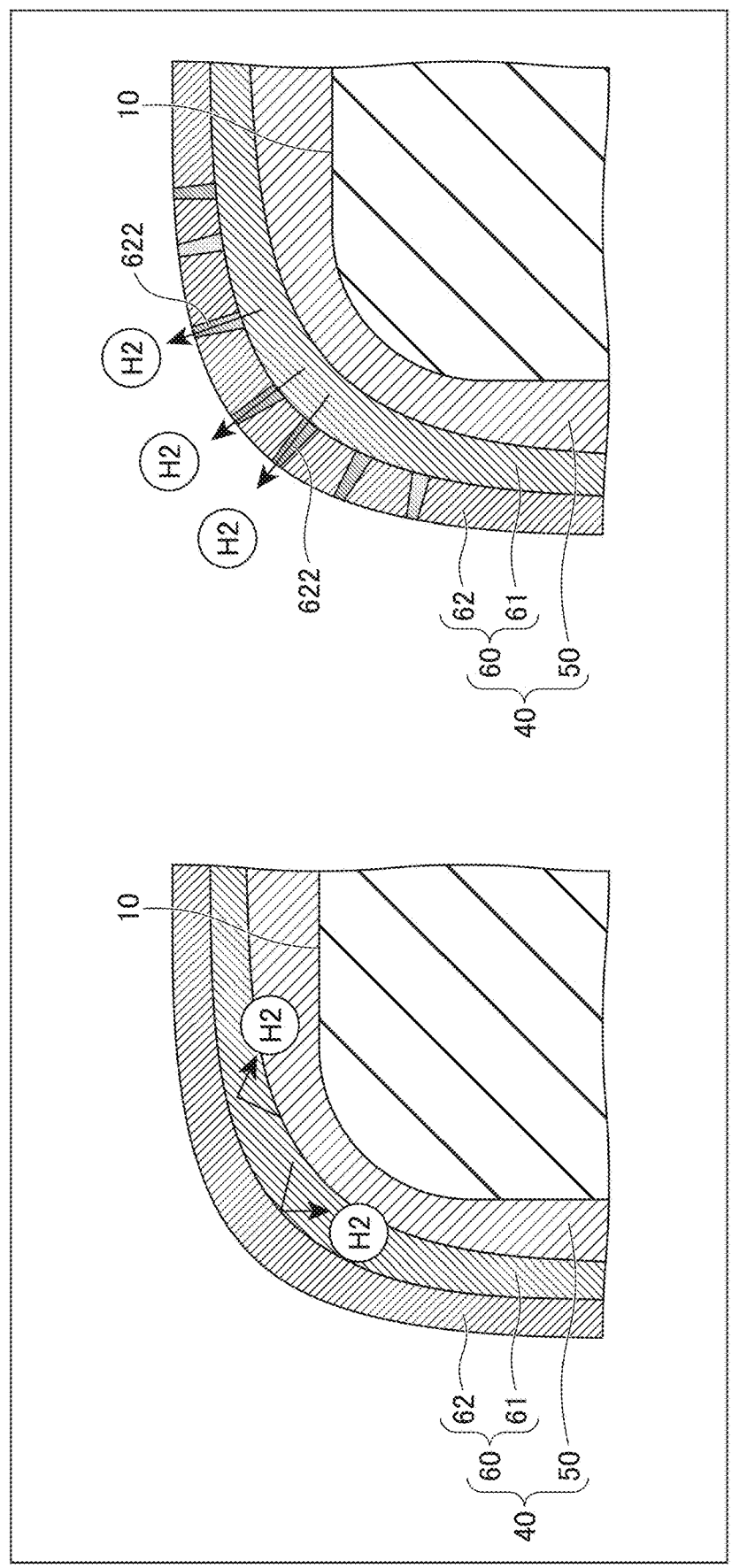
FIG. 7 is a schematic diagram for explaining a mechanism of the first preferred embodiment of the present invention.

FIG. 7 is a diagram schematically showing a mechanism for releasing occluded hydrogen. The diagram on the left side of FIG. 7 shows a comparative example. In the comparative example, the Sn-plated layer 62 is not provided with the intermetallic compound 622 that allows hydrogen to pass therethrough more easily than Sn and penetrates through the Sn-plated layer 62 in the thickness direction. Therefore, since it is impossible for hydrogen occluded in the Ni-plated layer 61 to pass through the Sn-plated layer 62, hydrogen occluded in the external electrode 40 remains. On the other hand, the diagram on the right side of FIG. shows the configuration of the external electrode 40 of the present preferred embodiment. In the present preferred embodiment, the Sn-plated layer 62 is provided with the intermetallic compounds 622 that allow hydrogen to pass therethrough more easily than Sn and penetrate through the Sn-plated layer 62 in the thickness direction. In the configuration of the present preferred embodiment, hydrogen occluded in the Ni-plated layer 61 is released outside the external electrode 40 by passing through the intermetallic compounds 622 that allow hydrogen to pass therethrough more easily than Sn which lies in the Sn-plated layer 62.

A method of heat treatment is also conceivable as a method of removing the occluded hydrogen, for example. However, when hydrogen is removed by heat treatment, high-temperature treatment conditions are required. The high-temperature heat treatment causes a new problem in that the surface of the external electrode 40 is oxidized and thus the solderability is reduced. In this regard, according to the configuration of the present preferred embodiment, it is possible to reduce or prevent the amount of hydrogen occluded in the Ni-plated layer 61 while reducing or preventing moisture infiltration into the capacitor. Furthermore, according to the configuration of the present preferred embodiment, the board mountability can be favorably maintained.

The intermetallic compound 622 that allows hydrogen to pass therethrough more easily than Sn is defined by crystals in which Sn in the Sn-plated layer 62 and Ni diffused in the Sn-plated layer 62 are rearranged at a constant composition. As a result, the Sn-plated layer 62 including the intermetallic compound 622 that allows hydrogen to pass therethrough more easily than Sn is provided as a film structure having a constant or substantially constant thickness without a through hole penetrating in the thickness direction. The intermetallic compound 622 that allows hydrogen to pass therethrough more easily than Sn has a function of reducing or preventing moisture infiltration into the interior of the multilayer ceramic capacitor 1 while releasing the hydrogen occluded in the Ni-plated layer 61 to the outside of the Sn-plated layer 62. Furthermore, since the Sn-plated layer 62 including the intermetallic compounds 622 is provided as a film structure having a constant or substantially constant thickness, the board mountability of the multilayer ceramic capacitor 1 is favorable.

The intermetallic compound 622 that allows hydrogen to pass therethrough more easily than Sn is preferably a compound including, for example, Ni and Sn as main components. This makes it easier for hydrogen to pass through. The intermetallic compound 622 that allows hydrogen to pass therethrough more easily than Sn is preferably $NiSn_4$, for example. Since $NiSn_4$ has a flat or substantially flat shape (plate shape), it tends to grow into a shape substantially penetrating through the Sn-plated layer 62. Therefore, the advantageous effects of the present preferred embodiment can be improved.

The intermetallic compound can be confirmed by the following exemplary method. First, the cross section of the multilayer ceramic capacitor 1 is polished to a ½ position in the W dimension to expose a particular LT cross-section. Thereafter, it is confirmed that, in the particular LT cross-section, a flat or substantially flat shape (plate shape) metal penetrating through the Sn-plated layer 62 in the thickness direction is present in the Sn-plated layer 62. Thereafter, compositional analysis by EDX is performed on the confirmed flat or substantially flat shape (plate shape) metal portion. As a result of the compositional analysis, when x and y of the molar ratio x:y of Ni and Sn are integers, the metal portion is determined to be an intermetallic compound. It should be noted that it is possible to confirm that the intermetallic compound is $NiSn_4$ by confirming that the molar ratio x:y of Ni to Sn is about 1:4.

Figure 8:
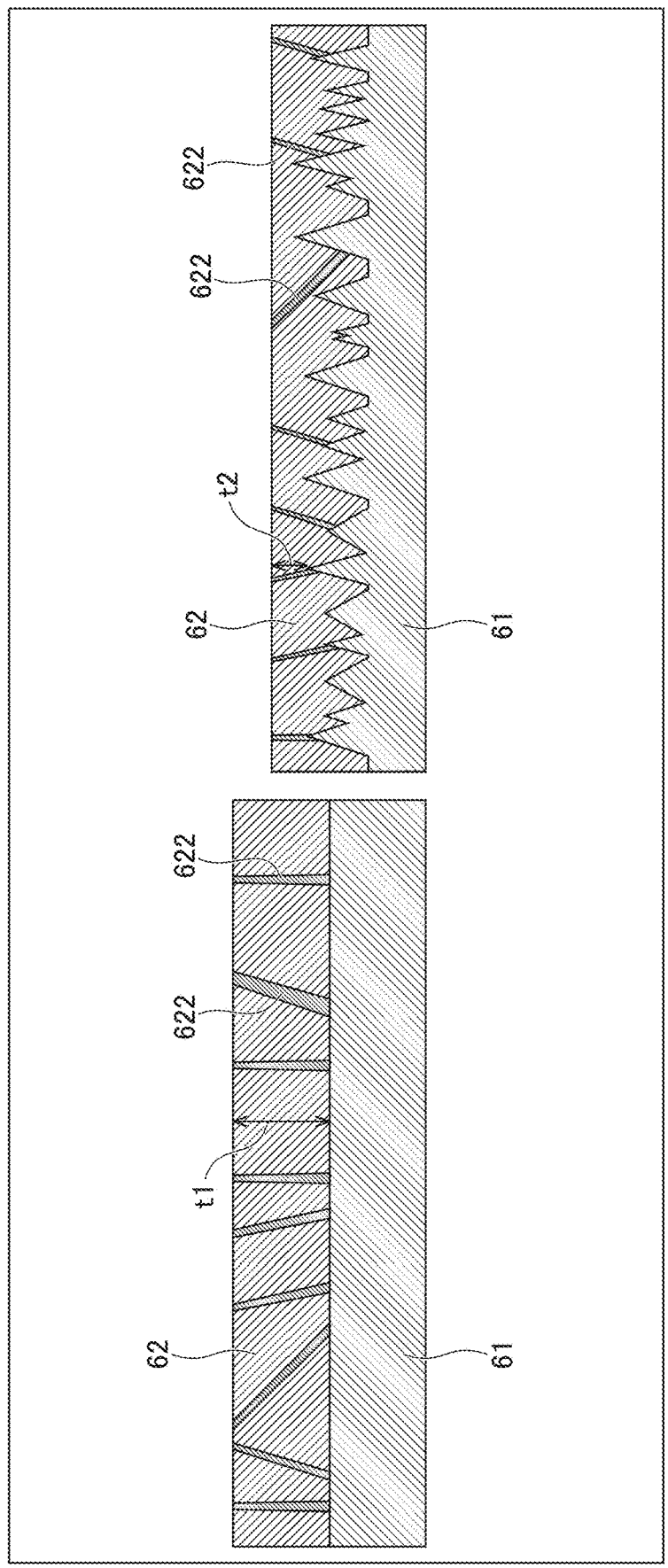
FIG. 8 is an enlarged cross-sectional view schematically showing a vicinity of an interface between a Ni-plated layer and a Sn-plated layer.

FIG. 8 is an enlarged cross-sectional view schematically showing a vicinity of an interface between the Ni-plated layer 61 and the Sn-plated layer 62. The surface of the Ni-plated layer 61 may be a surface having irregularities as shown on the right side of FIG. 8, unlike a flat surface as shown on the left side of FIG. 8. When the surface of the Ni-plated layer 61 has irregularities, arithmetic average roughness Ra of the surface of the Ni-plated layer 61 is preferably about 0.1 µm or more and about 0.5 µm or less, for example. When the surface of the Ni-plated layer 61 has irregularities, portions where the distance from the surface of the Ni-plated layer 61 to the surface of the Sn-plated layer 62 is shortened occur at the tops of the convex portions of the Ni-plated layer 61. For example, the distance t2 shown on the right side of FIG. 8 is shorter than the distance t1 shown on the left side of FIG. 8. As a result, the occurrence rate of the intermetallic compound of $NiSn_4$ extending from the Ni-plated layer 61 to the Sn-plated layer 62 is improved.

The area ratio of Ni/(Ni+Sn) when the surface of the Sn-plated layer 62 was analyzed by wavelength dispersive X-ray analysis (WDX) is preferably about 3% or more and about 50% or less, for example. As a result, it is possible to sufficiently secure the intermetallic compounds 622 penetrating through from the Ni-plated layer 61 to the outer surface of the Sn-plated layer 62. Therefore, it is possible to sufficiently permeate hydrogen. Furthermore, it is possible to ensure the solder wettability which is one of the roles of the Sn-plated layer 62. When the area ratio of Ni/(Ni+Sn) is less than about3%, hydrogen is less likely to be permeated from the Ni-plated layer 61 to the outer surface of the Sn-plated layer 62. Therefore, the state in which hydrogen is occluded in the Ni-plated layer 61 is likely to be maintained, and there is a possibility that the insulation resistance characteristics of the multilayer ceramic capacitor is deteriorated. Furthermore, when the area ratio of Ni/(Ni+Sn) becomes larger than about 50%, the solder wettability is deteriorated, and there is concern that failure in mounting the multilayer ceramic capacitor is likely to occur.

Figure 9:
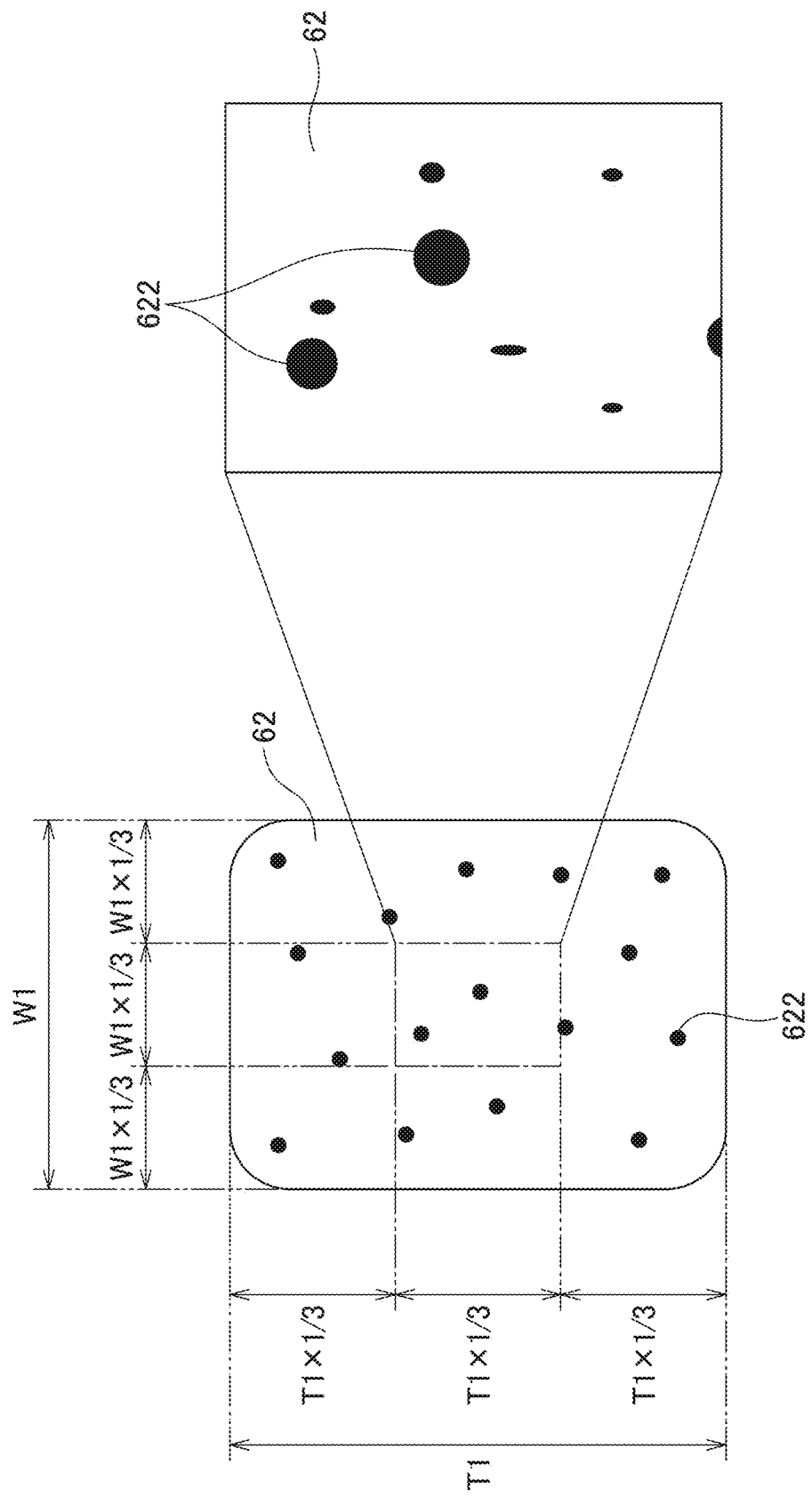
FIG. 9 is a diagram for explaining an exemplary method of confirming the area ratio of Ni/(Ni+Sn).

It should be noted that the area ratio of Ni/(Ni+Sn) can be confirmed by the following exemplary method. FIG. 9 is a diagram for explaining an exemplary method of confirming the area ratio of Ni/(Ni+Sn). First, as shown in FIG. 9, a center for confirming the area ratio is defined on a surface of the external electrode 40 provided on the end surface of the multilayer body 10 (the first end surface LS1, the second end surface LS2), i.e., on the surface of the Sn-plated layer 62. It should be noted that the center shown as an enlarged view on the right side of FIG. 9 is defined by the middle portion when the T dimension T1 of the external electrode 40 is divided into three equal portions and by the middle portion when the W dimension W1 of the external electrode 40 is divided into three equal portions as shown on the left side of FIG. 9. This center is analyzed by WDX to obtain a mapping image of Ni and Sn. The obtained image is subjected to the binarization process, and the area ratio of Ni/(Ni+Sn) is calculated based on the area of the portion determined to be Sn and the area of the portion determined to be Ni. It should be noted that FIG. 9 is a diagram showing an example when the T dimension T1 of the external electrode 40 is longer than the W dimension W1 of the external electrode 40. The center is set by the same or substantially the same method even when both the dimensions are equal or the T dimension T1 of the external electrode 40 is shorter than the W dimension W1 of the external electrode 40.

The external electrode 40 preferably includes the base electrode layer 50 between the multilayer body 10 and the Ni-plated layer 61. Thus, it is possible to obtain a more reliable external electrode 40.

The external electrode 40 of the present preferred embodiment may include a conductive resin layer. The conductive resin layer includes, for example, conductive particles and a thermosetting resin. When the conductive resin layer is provided as the base electrode layer 50, the conductive resin layer may be provided so as to cover the fired layer, or may be provided directly on the multilayer body 10 without providing the fired layer. If the conductive resin layer covers the baked layer, the conductive resin layer is disposed between the baked layer and the plated layer 60. The conductive resin layer may completely cover the fired layer or may cover a portion of the fired layer.

The conductive resin layer including a thermosetting resin is more flexible than a conductive layer made of, for example, a plated film or a fired product of a conductive paste. Therefore, even when an impact caused by physical shock or thermal cycle is applied to the multilayer ceramic capacitor 1, the conductive resin layer defines and functions as a buffer layer. Therefore, the conductive resin layer reduces or prevents the occurrence of cracking in the multilayer ceramic capacitor 1.

Metals of the conductive particles may be, for example, Ag, Cu, Ni, Sn, Bi or alloys including these. The conductive particle preferably includes Ag, for example. The conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the conductive particle.

Furthermore, the conductive particle may be, for example, a metal powder coated on the surface of the metal powder with Ag. When using those coated with Ag on the surface of the metal powder, the metal powder is preferably, for example, Cu, Ni, Sn, Bi, or an alloy powder thereof. In order to make the metal of the base material inexpensive while keeping the characteristics of Ag, it is preferable to use, for example, a metal powder coated with Ag.

Furthermore, the conductive particle may be formed by, for example, subjecting Cu and Ni to an oxidation prevention treatment. Furthermore, the conductive particle may be a metal powder coated with, for example, Sn, Ni, and Cu on the surface of the metal powder. When using those coated with Sn, Ni, and Cu on the surface of the metal powder, the metal powder is preferably, for example, Ag, Cu, Ni, Sn, Bi, or an alloy powder thereof.

The shape of the conductive particle is not particularly limited. For the conductive particle, a spherical metal powder, a flat metal powder, or the like can be used, However, it is preferable to use a mixture of a spherical metal powder and a flat metal powder.

The conductive particles included in the conductive resin layer mainly play a role of ensuring the conductivity of the conductive resin layer. Specifically, by a plurality of conductive particles being in contact with each other, an energization path is provided inside the conductive resin layer.

The resin of the conductive resin layer may include, for example, at least one selected from a variety of known thermosetting resins such as epoxy resin, phenolic resin, urethane resin, silicone resin, polyimide resin, and the like. Among those, epoxy resin is excellent in heat resistance, moisture resistance, adhesion, etc., and thus is one of the most preferable resins. Furthermore, it is preferable that the resin of the conductive resin layer include a curing agent together with a thermosetting resin. When epoxy resin is used as a base resin, the curing agent for the epoxy resin may be various known compounds such as, for example, phenols, amines, acid anhydrides, imidazoles, active esters, and amide-imides.

The conductive resin layer may include a plurality of layers. The thickest portion of the conductive resin layer is preferably about 10 μm or more and about 150 μm or less, for example.

It should be noted that the external electrode 40 may include only the plated layer 60 without providing the base electrode layer 50. That is, the multilayer ceramic capacitor 1 may include the plated layer 60 that is directly electrically connected to the first internal electrode layer 31 and the second internal electrode layer 32. In such a case, the plated layer 60 may be provided after the catalyst is disposed on the surface of the multilayer body 10 as a pretreatment.

It should be noted that, when the dimension in the length direction of the multilayer ceramic capacitor 1 including the multilayer body 10 and the external electrode 40 is defined as the L dimension, the L dimension is preferably about 1.0 mm or more and about 3.2 mm or less, for example. Furthermore, when the dimension in the height direction of the multilayer ceramic capacitor 1 is defined as the T dimension, the T dimension is preferably about 0.5 mm or more and about 2.5 mm or less, for example. When the dimension in the width direction of the multilayer ceramic capacitor 1 is defined as the W dimension, the W dimension is preferably about 0.5 mm or more and about 2.5 mm or less, for example.

As described above, the multilayer ceramic capacitor 1 according to the present preferred embodiment includes the multilayer body 10 including the plurality of laminated dielectric layers 20, the multilayer body further including the first main surface TS1 and the second main surface TS2 opposing each other in the height direction, the first side surface WS1 and a second side surface WS2 opposing each other in the width direction perpendicular or substantially perpendicular to the height direction, and the first end surface LS1 and the second end surface LS2 opposing each other in the length direction perpendicular or substantially perpendicular to the height direction and the width direction, first internal electrode layers 31 provided on the plurality of dielectric layers 20 and exposed at the first end surface LS1, second internal electrode layers 32 provided on the plurality of dielectric layers 20 and exposed at the second end surface LS2, the first external electrode 40A connected to the first internal electrode layers 31 and provided on the first end surface LS1, and the second external electrode 40B connected to the second internal electrode layers 32 and provided on the second end surface LS2. In the multilayer ceramic capacitor 1, the first external electrode 40A and the second external electrode 40B each include the Ni-plated layer 61 and the Sn-plated layer 62 provided on the Ni-plated layer 61, and the Sn-plated layer 62 includes an intermetallic compound 622 that penetrates through the Sn-plated layer 62 in the thickness direction and allows hydrogen to pass therethrough more easily than Sn. Thus, it is possible to reduce or prevent a decrease in the insulation resistance characteristics while reducing or preventing moisture infiltration into the capacitor.

Furthermore, the multilayer ceramic capacitor 1 according to the present preferred embodiment includes the multilayer body 10 including the plurality of laminated dielectric layers 20 and the plurality of laminated internal electrode layers 30, and the external electrodes 40 each connected to the internal electrode layers 30. In the multilayer ceramic capacitor 1, the external electrodes 40 each include the Ni-plated layer 61 and the Sn-plated layer 62 provided on the Ni-plated layer 61, and the Sn-plated layer 62 includes the hydrogen permeation portion which includes an intermetallic compound that allows hydrogen to pass therethrough more easily than Sn, and penetrates through the Sn-plated layer 62 in the thickness direction. Thus, it is possible to reduce or prevent a decrease in the insulation resistance characteristics, while reducing or preventing moisture infiltration into the capacitor.

Next, a non-limiting example of a method of manufacturing the multilayer ceramic capacitor 1 of the present preferred embodiment will be described.

A dielectric sheet for the dielectric layer 20 and a conductive paste for the internal electrode layer 30 are provided. The conductive paste for the dielectric sheet and the internal electrode includes a binder and a solvent. Known binders and solvents may be used.

On the dielectric sheet, a conductive paste for the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed is prepared.

By a predetermined number of dielectric sheets in which the pattern of the internal electrode layer is not printed being laminated, a portion defining and functioning as the first main surface-side outer layer portion 12 in the vicinity of the first main surface TS1 is formed. On top of that, the dielectric sheets in which the pattern of the first internal electrode layer 31 is printed, and the dielectric sheets in which the pattern of the second internal electrode layer 32 is printed are sequentially laminated, such that a portion defining and functioning as the inner layer portion 11 is formed. On this portion defining and functioning as the inner layer portion 11, a predetermined number of dielectric sheets in which the pattern of the internal electrode layer is not printed are laminated, such that a portion defining and functioning as the second main surface-side outer layer portion 13 in the vicinity of the second main surface TS2 is formed. Thus, a laminated sheet is produced.

The laminated sheet is pressed in the height direction by hydrostatic pressing, for example, such that a laminated block is produced.

The laminated block is cut to a predetermined size, such that laminate chips are cut out. At this time, corners and ridges of the laminate chip may be rounded by barrel polishing or the like, for example.

The laminate chip is fired to produce the multilayer body 10. The firing temperature depends on the materials of the dielectric layers 20 and the internal electrode layers 30, but is preferably about 900° C. or more and about 1400° C. or less, for example.

The conductive paste defining and functioning as base electrode layer 50 is applied to both end surfaces of the multilayer body 10. In the present preferred embodiment, the base electrode layer 50 is fired layers. A conductive paste including a glass component and metal is applied to the multilayer body 10 by, for example, a method such as dipping. Thereafter, a firing process is performed to form the base electrode layer 50. The temperature of the firing process at this time is preferably about 700° C. or higher and about 900° C. or lower, for example.

In a case in which the laminate chip before firing and the conductive paste applied to the laminate chip are fired simultaneously, it is preferable that the fired layer is formed by firing a layer to which a ceramic material is added instead of a glass component. At this time, it is particularly preferable to use, as the ceramic material to be added, the same or substantially the same type of ceramic material as the dielectric layer 20. In this case, a conductive paste is applied to the laminate chip before firing, and the laminate chip and the conductive paste applied to the laminated chip are fired simultaneously, such that the multilayer body 10 including a fired layer formed therein is formed.

It should be noted that, in a case in which the base electrode layer 50 is formed with a thin film layer, such a thin film layer as the base electrode layer 50 is formed at a portion where the external electrode 40 is preferably formed by performing masking or the like, for example. The thin film layer is formed by a thin film forming method such as, for example, a sputtering method or a deposition method. The thin film layer is a layer of about 1 μm or less, for example, on which metal particles are deposited.

It should be noted that, when the conductive resin layer is provided as the base electrode layer 50, the conductive resin layer may be provided so as to cover the fired layer, or may be provided directly on the multilayer body 10 without providing the fired layer. When the conductive resin layer is provided, a conductive resin paste including a thermosetting resin and a metal component is applied onto the fired layer or the multilayer body 10, and then heat-treated at a temperature of about 250° C. to about 550° C. or higher. As a result, the thermosetting resin is thermally cured to form a conductive resin layer. The atmosphere at the time of this heat treatment is preferably, for example, an N2 atmosphere. Furthermore, in order to prevent scattering of the resin and to prevent oxidation of various metal components, the oxygen concentration is preferably about 100 ppm or less, for example.

Thereafter, the plated layer 60 is formed on the surface of the base electrode layer 50. In the present preferred embodiment, the Ni-plated layer 61 and the Sn-plated layer 62 are formed as the plated layer 60.

In the present preferred embodiment, first, the Ni-plated layer 61 is formed on the surface of the base electrode layer 50. Thereafter, zirconia powder is sprayed onto the surface of the Ni-plated layer 61. Thus, irregularities are formed on the surface of the Ni-plated layer 61. The arithmetic average roughness Ra of the surface of the unevenness at this time is preferably about 0.1 μm or more and about 0.5 μm or less, for example.

Next, the Sn-plated layer 62 is formed on the Ni-plated layer 61. As described above, when the surface of the Ni-plated layer 61 has irregularities, portions where the distance from the surface of the Ni-plated layer 61 to the surface of the Sn-plated layer 62 is shortened occur at the tops of the convex portions of the Ni-plated layer 61. As a result, the occurrence rate of the intermetallic compound of $NiSn_4$ extending from the Ni-plated layer 61 to the Sn-plated layer 62 is improved.

Upon performing the plating process, electrolytic plating or electroless plating, for example, may be used. However, the electroless plating has a disadvantage in that a pretreatment with a catalyst or the like is necessary in order to improve the plating deposition rate, and thus the process becomes complicated. Therefore, normally, electrolytic plating is preferably used.

Finally, the multilayer ceramic capacitor is subjected to heat treatment to form the intermetallic compounds 622 that allow hydrogen to pass therethrough more easily than Sn, in the Sn-plated layer 62. More specifically, by heating the multilayer ceramic capacitor at a temperature of, for example, about 120° C. or less, the intermetallic compounds 622 that allow hydrogen to pass therethrough more easily than Sn are formed in the Sn-plated layer 62. In the present preferred embodiment, the intermetallic compounds of $NiSn_4$ are formed as the intermetallic compounds 622 that allow hydrogen to pass therethrough more easily than Sn. The intermetallic compounds of $NiSn_4$ are formed at a temperature of, for example, about 120° C. or less. However, for example, if heating is performed even once at about 130° C. or higher, no intermetallic compounds of $NiSn_4$ are formed even if heating is performed at about 120° C. or less thereafter.

The surface area of the intermetallic compound of $NiSn_4$ present on the surface of the Sn-plated layer 62 is formed in proportion to the heating duration. In the present preferred embodiment, the heat treatment time is adjusted, for example, between about 10 hours and about 120 hours so that the area ratio of Ni/(Ni+Sn) on the surface of the Sn-plated layer 62 becomes a desired area ratio.

The plated layer 60 may be directly disposed on the exposed portion of the internal electrode layer 30 of the multilayer body 10 without providing the base electrode layer 50.

By such a manufacturing process, the multilayer ceramic capacitor 1 is manufactured.

According to the multilayer ceramic capacitor 1 of the present preferred embodiment, the following advantageous effects are achieved.

(1) As described above, the multilayer ceramic capacitor according to the present preferred embodiment includes the multilayer body 10 including the plurality of laminated dielectric layers 20, the multilayer body further including the first main surface TS1 and the second main surface TS2 opposing each other in the height direction, the first side surface WS1 and a second side surface WS2 opposing each other in the width direction perpendicular or substantially perpendicular to the height direction, and the first end surface LS1 and the second end surface LS2 opposing each other in the length direction perpendicular or substantially perpendicular to the height direction and the width direction, first internal electrode layers 31 provided on the plurality of dielectric layers 20 and exposed at the first end surface LS1, second internal electrode layers 32 provided on the plurality of dielectric layers 20 and exposed at the second end surface LS2, the first external electrode 40A connected to the first internal electrode layers 31 and provided on the first end surface LS1, and the second external electrode 40B connected to the second internal electrode layers 32 and provided on the second end surface LS2. In the multilayer ceramic capacitor 1, the first external electrode 40A and the second external electrode 40B each include the Ni-plated layer 61 and the Sn-plated layer 62 provided on the Ni-plated layer 61, and the Sn-plated layer 62 includes an intermetallic compound 622 that penetrates through the Sn-plated layer 62 in the thickness direction and allows hydrogen to pass therethrough more easily than Sn. Thus, it is possible to reduce or prevent a decrease in the insulation resistance characteristics while reducing or preventing moisture infiltration into the capacitor.

(2) In the present preferred embodiment, the first external electrode 40A and the second external electrode 40B each include a base electrode layer between the multilayer body 10 and the Ni-plated layer 61. Thus, it is possible to obtain a more reliable external electrode 40.

(3) In the present preferred embodiment, the intermetallic compound 622 includes Ni and Sn as main components. Thus, hydrogen easily passes through the intermetallic compound 622.

(4) In the present preferred embodiment, the intermetallic compound 622 is $NiSn_4$. Since $NiSn_4$ has a flat or substantially flat shape, it tends to grow into a shape substantially penetrating through the Sn-plated layer 62 in the thickness direction. Therefore, the advantageous effects of the present preferred embodiment can be further improved.

(5) In the present preferred embodiment, an area ratio of Ni/(Ni+Sn) when analyzing a surface of the Sn-plated layer 62 by wavelength dispersive X-ray analysis (WDX) is about 3% or more and about 50% or less. This makes it possible to achieve both high reliability and high mountability.

Second Preferred Embodiment

Figure 10:
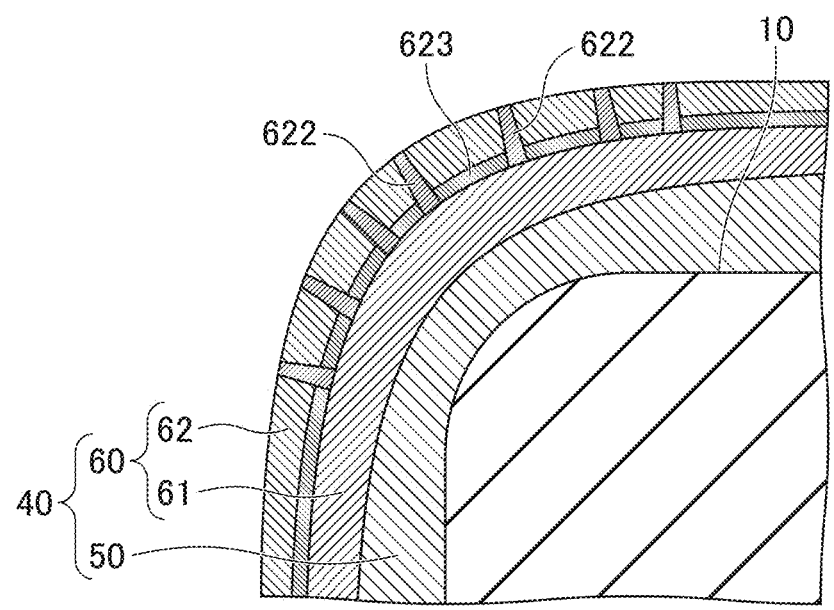
FIG. 10 is an enlarged sectional view schematically showing a cross section of an external electrode of a multilayer ceramic capacitor of a second preferred embodiment of the present invention, and corresponding to FIG. 5.

Hereinafter, a multilayer ceramic capacitor 1 according to a second preferred embodiment of the present invention will be described. In the following, the same or corresponding components as those of the first preferred embodiment are denoted by the same reference numerals, and the detailed descriptions thereof are omitted. FIG. 10 is an enlarged sectional view schematically showing a cross section of an external electrode of the multilayer ceramic capacitor 1 of the second preferred embodiment, and corresponding to FIG. 5.

A plated layer 60 in the present preferred embodiment is different from that of the first preferred embodiment.

In the present preferred embodiment, as shown in FIG. 10, there is an intermetallic compound 623 of, for example, $Ni_3Sn_4$ at the interface between the Ni-plated layer 61 and the Sn-plated layer 62. The intermetallic compound 623 of $Ni_3Sn_4$ connects the adjacent intermetallic compounds 622 of $NiSn_4$ in the Sn-plated layer 62 to each other through the interface between the Ni-plated layer 61 and the Sn-plated layer 62. That is, the intermetallic compound 623 of $Ni_3Sn_4$ defines and functions as a hydrogen releasing bypass that releases the occluded hydrogen in the Ni-plated layer 61. The intermetallic compound 623 of $Ni_3Sn_4$ makes it easier for the hydrogen occluded in the Ni-plated layer 61 to reach the intermetallic compound 622 of $NiSn_4$, and improves the efficiency of hydrogen releasing.

The intermetallic compound 623 of $Ni_3Sn_4$ is present at the interface between the Ni-plated layer 61 and the Sn-plated layer 62. The intermetallic compound 623 of $Ni_3Sn_4$ may be partially present. However, the intermetallic compound 623 of $Ni_3Sn_4$ is preferably provided in a layered manner. That is, the intermetallic compound 623 of $Ni_3Sn_4$ is preferably provided as an intermetallic compound layer. This makes it possible to obtain the above-described advantageous effects more favorably. The thickness of the intermetallic compound 623 of $Ni_3Sn_4$ is preferably about 0.1 μm or more and about 1 μm or less, for example.

Next, a non-limiting example method of manufacturing the multilayer ceramic capacitor 1 of the present modified example will be described.

Since the procedure until the step of performing the plating process is the same as the manufacturing method of the above preferred embodiment, a description thereof will be omitted.

After the plating process, a plurality of heat treatments are performed on the multilayer ceramic capacitor to form the intermetallic compound 622 of $NiSn_4$ and the intermetallic compound 623 of $Ni_3Sn_4$ in the plated layer 60. More specifically, when the multilayer ceramic capacitor is heated at a temperature of, for example, about 120° C. or less by the first heat treatment, the intermetallic compounds 622 that allow hydrogen to pass therethrough more easily than Sn are formed in the Sn-plated layer 62. In the present preferred embodiment, the intermetallic compounds 622 of $NiSn_4$ are formed as the intermetallic compounds 622 that allow hydrogen to pass therethrough more easily than Sn. On the other hand, when the multilayer ceramic capacitor is heated at a temperature of, for example, about 130° C. or higher by the second heat treatment, the intermetallic compound 623 of $Ni_3Sn_4$ is preferentially formed at the interface between the Ni-plated layer 61 and the Sn-plated layer 62. When heating is performed at about 130° C., the intermetallic compound 622 of $NiSn_4$ is less likely to be formed even when heating is performed at about 120° C. or less thereafter. This is because it is considered that the intermetallic compound 623 of $Ni_3Sn_4$ generated by heating at about 130° C. or higher defines and functions as a wall present at the interface between the Ni-plated layer 61 and the Sn-plated layer 62, and blocks the diffusion of Ni which is required for the intermetallic compound 622 of $NiSn_4$ to grow. Therefore, first, a first heat treatment for heating at a temperature of about 120° C. or less is performed to form $NiSn_4$ as the intermetallic compound 622 that allows hydrogen to pass therethrough more easily than Sn, following which a second heat treatment for heating at a temperature of about 130° C. or higher is performed to form the intermetallic compound 623 of $Ni_3Sn_4$ at the interface between the Ni-plated layer 61 and the Sn-plated layer 62.

It should be noted that the surface area of the intermetallic compound of $NiSn_4$ present on the surface of the Sn-plated layer 62 is formed in proportion to the heat duration of the first heat treatment. In the present preferred embodiment, the heat treatment time is adjusted, for example, between about 10 hours and about 120 hours so that the area ratio of Ni/(Ni+Sn) on the surface of the Sn-plated layer 62 becomes a desired area ratio. For example, when manufacturing the multilayer ceramic capacitor 1 such that the area ratio of Ni/(Ni+Sn) on the surface of the Sn-plated layer 62 is about 3%, a heat treatment of about 15 hours to about 17 hours at about 90° C. is performed. Furthermore, for example, when manufacturing a multilayer ceramic capacitor such that the area ratio of Ni/(Ni+Sn) on the surface of the Sn-plated layer 62 is about 50%, heat treatment of about 118 hours to about 120 hours at about 90° C. is performed. The second heat treatment is preferably performed at a temperature of about 130° C. or higher for about 1 hour or more, for example.

In this manner, the multilayer ceramic capacitor of the present preferred embodiment is manufactured.

According to the multilayer ceramic capacitor 1 of the present preferred embodiment, the following advantageous effects are obtained in addition to the abovementioned (1) to (5).

(6) In the present preferred embodiment, an intermetallic compound 623 of $Ni_3Sn_4$ is present at an interface between the Ni-plated layer 61 and the Sn-plated layer 62 provided on the Ni-plated layer 61. As a result, hydrogen occluded in the Ni-plated layer 61 easily reaches the intermetallic compound 622 of $NiSn_4$, such that the hydrogen releasing efficiency is improved.

The configuration of the multilayer ceramic capacitor 1 is not limited to the configuration shown in FIGS. 1 to 4. For example, the multilayer ceramic capacitor 1 may include a two-portion structure, a three-portion structure, or a four-portion structure as shown in FIGS. 11A, 11B, and 11C.

Figure 11A:
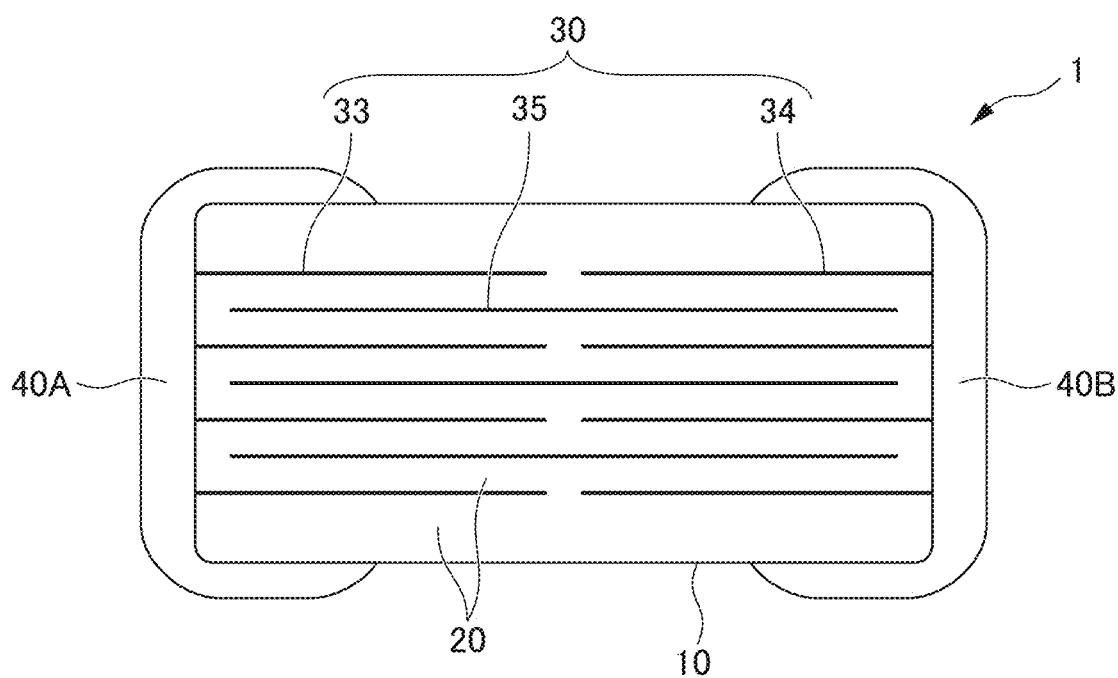
FIG. 11A is a diagram showing a multilayer ceramic capacitor including a two-portion structure.
Figure 11B:
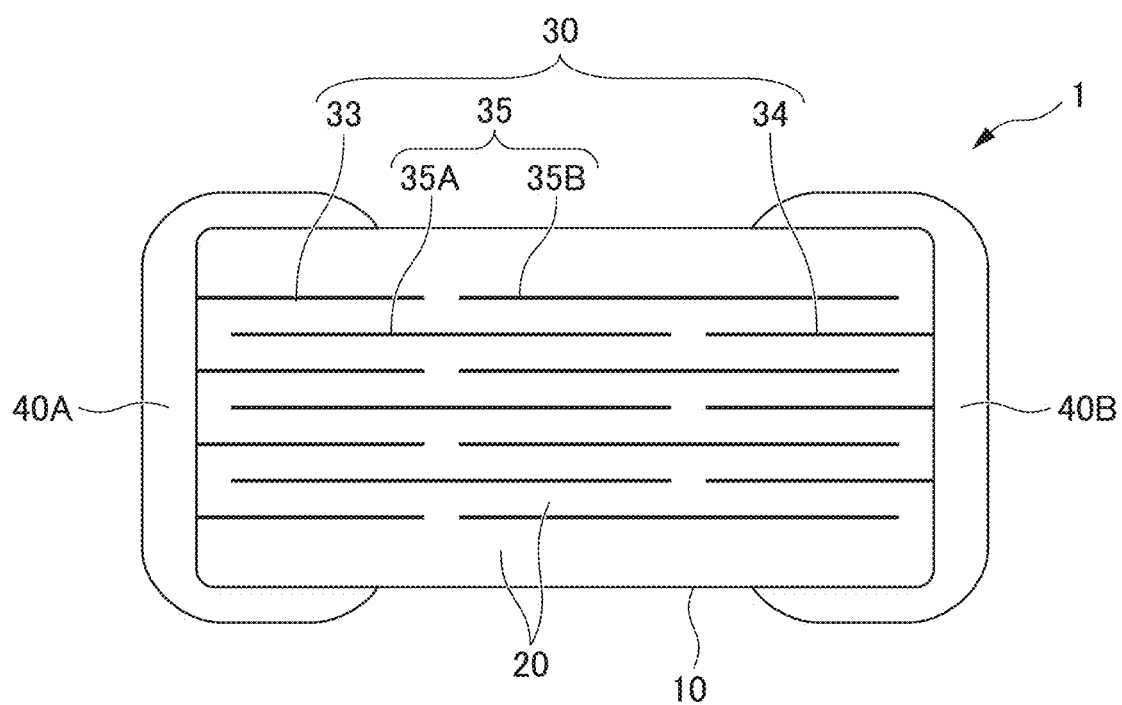
FIG. 11B is a diagram showing a multilayer ceramic capacitor including a three-portion structure.
Figure 11C:
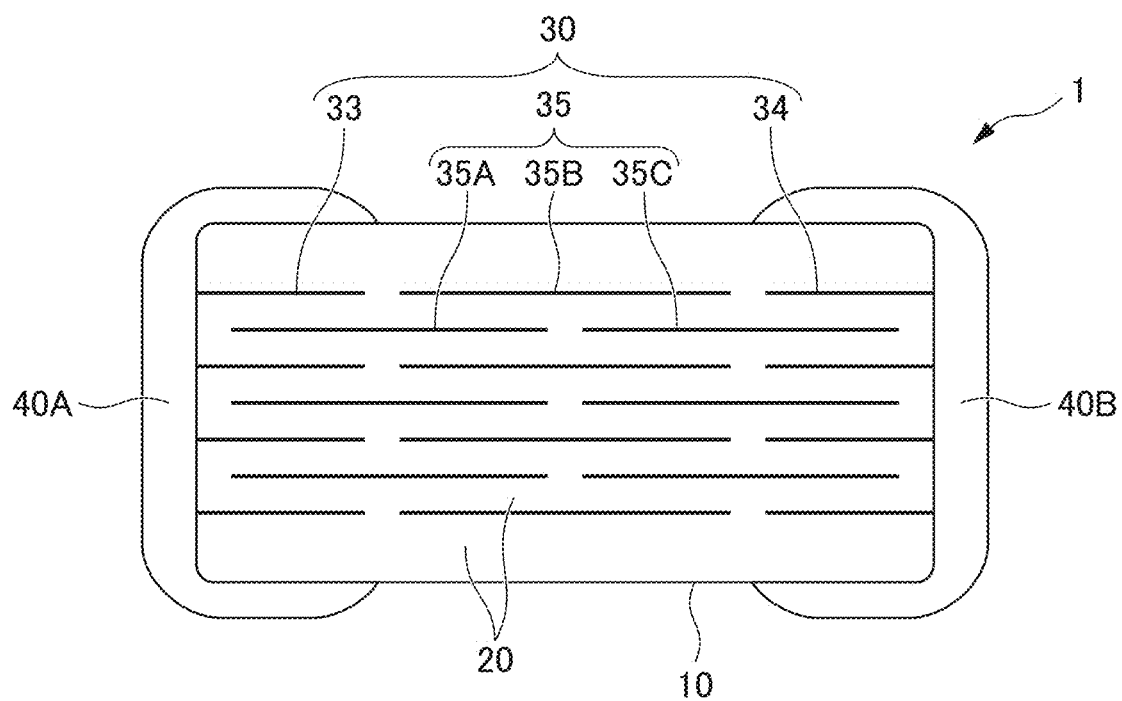
FIG. 11C is a diagram showing a multilayer ceramic capacitor including a four-portion structure.

The multilayer ceramic capacitor 1 shown in FIG. 11A is a multilayer ceramic capacitor 1 including a two-portion structure. The multilayer ceramic capacitor 1 includes, as the internal electrode layer 30, a floating internal electrode layer 35 which does not extend to either side of the first end surface LS1 and the second end surface LS2, in addition to the first internal electrode layer 33 and the second internal electrode layer 34. The multilayer ceramic capacitor 1 shown in FIG. 11B includes a three-portion structure including, as the floating internal electrode layer 35, a first floating internal electrode layer 35A, and a second floating internal electrode layer 35B. The multilayer ceramic capacitor 1 shown in FIG. 11C includes a four-portion structure including, as the floating internal electrode layer 35, the first floating internal electrode layer 35A, the second floating internal electrode layer 35B, and a third floating internal electrode layer 35C. Thus, by providing the floating internal electrode layer 35 as the internal electrode layer 30, the multilayer ceramic capacitor 1 includes a structure in which the counter electrode portion is divided into a plurality of counter electrode portions. With such a configuration, a plurality of capacitor components are provided between the opposing internal electrode layers 30, such that a configuration in which these capacitor components are connected in series is provided. Therefore, the voltage applied to the respective capacitor components is reduced, and thus, it is possible to achieve a high breakdown voltage of the multilayer ceramic capacitor 1. The multilayer ceramic capacitor 1 of the present preferred embodiment may be a multiple-portion structure including four or more portions.

The multilayer ceramic capacitor 1 may be a two-terminal capacitor including two external electrodes, or may be of multi-terminal capacitor including a large number of external electrodes.

First Experimental Example

According to a non-limiting example of a manufacturing method described in the first preferred embodiment, a multilayer ceramic capacitor such that the area ratio of Ni/(Ni+Sn) on the surface of the Sn-plated layer was about 0% to about 55% was manufactured as a sample of the first experimental example of a preferred embodiment of the present invention. Thereafter, an evaluation test of IR (insulation resistance) was performed using the manufactured samples. In addition, a reliability test by a high-temperature load test and a mountability test were performed.

1. Manufacturing of Multilayer Ceramic Capacitors

First, according to the non-limiting example manufacturing method described in the first preferred embodiment, multilayer ceramic capacitors having the following specifications were manufactured as samples of the first experimental example.

Dimensions of multilayer ceramic capacitor: L×W×T=about 1.15 mm× about 0.65 mm× about 0.65 mm Dielectric layer: $BaTiO_3$ Capacitance: about 4.7 μF Rated voltage: about 25 V Base electrode layer: electrode including conductive metal (Cu) and glass component Plated layer: 2-layer formation of about 2 μm of Ni-plated layer and about 2 μm of Sn-plated layer Intermetallic Compounds in Sn-plated layer: $NiSn_4$ Area ratio of Ni/(Ni+Sn) on surface of Sn-plated layer: about 0% to about 55%

Here, the area ratio of Ni/(Ni+Sn) on the surface of the Sn-plated layer was adjusted by the following exemplary method.

First, multilayer ceramic capacitors were prepared on which heat treatments of about 90° C. at a plurality of different arbitrary times (e.g., about 0 minutes to about 120 minutes) were performed. Then, the surfaces of the Sn-plated layers of these multilayer ceramic capacitors were analyzed by FE-WDX.

Furthermore, based on the analytical results of FE-WDX, for the multilayer ceramic capacitors for which heat treatments were performed at a plurality of different times, the area ratio of Ni/(Ni+Sn) on the surface of the Sn-plated layer was calculated to prepare the calibration curve of the area ratio of Ni/(Ni+Sn) on the surface of the Sn-plated layer with respect to the heat treatment time t. Then, the heat treatment time such that the area ratio of Ni/(Ni+Sn) on the surface of the Sn-plated layer is about 0% to about 55% was calculated from this calibration curve to produce multilayer ceramic capacitors as samples of the experimental example.

It should be noted that the area ratio of Ni/(Ni+Sn) was confirmed by the following exemplary method. First, as shown in FIG. 9, a center for confirming the area ratio was defined on the surface of the external electrode provided on the end surface of the multilayer body, i.e., on the surface of the Sn-plated layer. A portion defined by a middle portion when the T dimension T1 of the external electrode was divided into three equal portions and a middle portion when the W dimension W1 of the external electrode was divided into three equal portions was defined as the center. The center was analyzed by FE-WDX to obtain a mapping image of Ni and Sn. The obtained image was subjected to the binarization process, and the area ratio of Ni/(Ni+Sn) was calculated based on the area of the portion determined to be Ni and the area of the portion determined to be Sn.

Table 1 shows samples of the multilayer ceramic capacitors having different area ratios of Ni/(Ni+Sn) manufactured based on the above-described calibration curve, and the heat treatment time at about 90° C. when the samples were manufactured.

TABLE 1

| (Ni/Ni + Sn)AREA RATIO(%) | HEAT TREATMENT TIME AT 90° C.(hr) |
|---|---|
| 0 | 0 |
| 1 | 5 |
| 2 | 10 |
| 3 | 16 |
| 4 | 21 |
| 5 | 26 |
| 10 | 41 |
| 15 | 51 |
| 20 | 60 |
| 25 | 70 |
| 30 | 80 |
| 35 | 90 |
| 40 | 100 |
| 45 | 109 |
| 50 | 119 |
| 51 | 121 |
| 52 | 123 |
| 53 | 125 |
| 54 | 127 |
| 55 | 129 |

2. Evaluation Test of IR (Insulation Resistance)

An evaluation test of IR was performed on the samples of the first experimental example.

For samples of the comparative example, five multilayer ceramic capacitors without including an intermetallic compound (multilayer ceramic capacitors having the area ratio of (Ni/(Ni+Sn) of 0%) were prepared. The samples for the comparative example had the same or substantially the same structure as those of the Example described below, except that those multilayer ceramic capacitors did not include an intermetallic compound.

For samples of the Example, multilayer ceramic capacitors were prepared in which $NiSn_4$ as an intermetallic compound penetrating through the Sn-plated layer in the thickness direction was formed. It should be noted that, in this evaluation test, five samples having the area ratio of Ni/(Ni+Sn) of about 5% were prepared.

The measurements of IR were performed at three times of before the high-temperature load test, after the high-temperature load test of about 50 hours, and after peeling off the Sn-plated layer after the high-temperature load test of about 50 hours. It should be noted that the deterioration of the IR characteristic due to the hydrogen occlusion can be recovered by peeling off the Sn plating before short circuit. At this time, in order to confirm the advantageous effects of hydrogen releasing of the samples of the Example including the intermetallic compound of $NiSn_4$, the measurements of IR were also performed on the samples after peeling off the Sn plating. The test conditions of the evaluation test are shown below.

Test condition for high-temperature load test: about 85° C./25 V/50 hours

Figure 12:
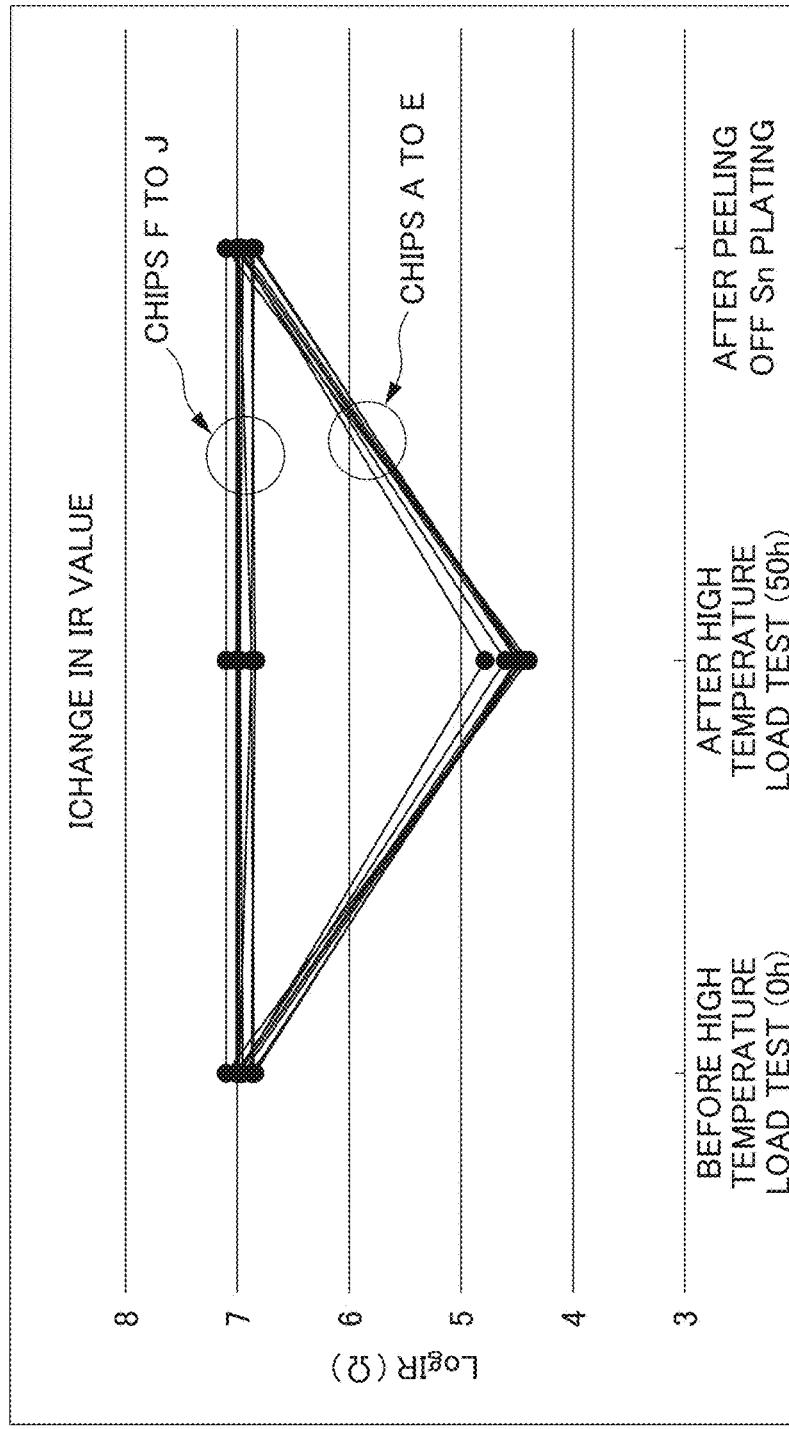
FIG. 12 is a diagram illustrating the results of evaluation tests of IR in first experimental examples of a preferred embodiment of the present invention.

Conditions for measuring IR: measuring after heat treatment at about 150° C. for 1 hour, and allowing to stand at room temperature for about 24 hours Sn plating peeling method: immersing the external electrode coated with Sn plating in "Enstrip TL-015" available from Meltex Inc. for a predetermined time, and peeling off only Sn plating FIG. 12 is a diagram illustrating the results of evaluation tests of IR in first experimental examples.

The IR values of the chips A, B, C, D, and E, which were the samples of the comparative example, became lower after the high-temperature load test for about 50 hours, than the IR values of them before the high-temperature load test. Thereafter, when the IR values were measured by peeling off the Sn plating, the IR values were recovered to the IR values before the high-temperature load test. On the other hand, the IR values of the chips F, G, H, I, and J, which were samples of the Example, rarely changed from any of the IR values before the high temperature load test, the IR values after the high temperature load test of about 50 hours, and the subsequent IR values after peeling off the Sn plating.

Through this evaluation test, it was confirmed that the samples of the example in which $NiSn_4$ as an intermetallic compound penetrating through the Sn-plated layer in the thickness direction was formed provided an advantageous effect in reducing or preventing the deterioration of IR characteristics due to hydrogen occlusion as compared with the samples of the comparative example which did not include the intermetallic compound.

3. Reliability Test by High-Temperature Load Test and Mountability Test

The samples of the first experimental example were subjected to a reliability test by a high temperature load test and a mountability test.

In each of the high-temperature load test (reliability test) and the mountability test, 50 samples having different area ratios (refer to Table 1) were prepared, each of which having the area ratio of Ni/(Ni+Sn) in the range of about 0% to about 55%.

In the high-temperature load test, a voltage corresponding to twice the rated voltage was applied to each sample for about 12 hours in an environment in which at least about 20° C. was added to the guaranteed temperature range. As a result, samples in which deterioration such that the resistance value rapidly drops with respect to the initial value occurred were judged as samples having a failure in reliability. More specifically, a voltage of about 50 V corresponding to twice the rated voltage was applied to the samples having the rated voltage of about 25 V for about 12 hours under the above-described temperature environment. As a result, samples whose resistance value dropped to about 1/10 or less of the initial value and samples which stopped operating were judged as samples having a failure in reliability. Then, the number of samples judged as samples having a failure in reliability in the high-temperature load test was counted as the number of failure samples in the high-temperature load test.

It should be noted that, in order to confirm that failure in reliability was attributed to hydrogen occluded in the Ni-plated layer, i.e., in order to confirm that failure in reliability was not attributed to cracks, the following exemplary evaluation was performed.

Each of the samples judged as failure in reliability was polished after being solidified with a resin, and the cross section of the polished sample was observed to confirm whether or not cracks were present in the capacitor active portion. Here, if no crack was found in the capacitor active portion, the sample was determined as failure in reliability in view of the decrease in reliability due to hydrogen occluded in the Ni-plated layer. A specific exemplary evaluation method is as follows.

First, the first end surface or the second end surface of the multilayer ceramic capacitor solidified with a resin is polished so as to be parallel or substantially parallel to the first end surface or the second end surface. Here, when polishing is started from the first end surface, the confirmation of the presence or absence of cracks is started from a position where a tip, which is in the vicinity of the first end surface, of the internal electrode of the second internal electrode exposed at the second end surface begins to emerge. Thereafter, the confirmation of the presence or absence of cracks continues until the position where the tip vanishes, which is in the vicinity of the second end surface, of the internal electrode of the first internal electrode exposed at the first end surface while advancing polishing to the second end surface, i.e., until the first internal electrode is no longer confirmed. It should be noted that, in the results of the confirmation at this time, cracks were not confirmed in the samples having a failure in reliability shown in Table 2 below. Therefore, it was determined that a failure in reliability in the samples having a failure in reliability in Table 2 below was attributed to hydrogen occluded in the Ni-plated layer.

In the mountability test, evaluation was performed by mountability test using a mounter.

First, a cover tape was peeled off from an embossed tape in which the multilayer ceramic capacitors as samples of the experimental example were packaged. Thereafter, the multilayer ceramic capacitors were suctioned using the nozzle of a mounter mounting machine. In consideration of the chip size of the multilayer ceramic capacitor, a nozzle having an appropriate suction diameter was selected. After suctioning with the nozzle, the multilayer ceramic capacitors were mounted on the board. After the mounting operation, the number of chips detached from the board was counted as the number of failure samples in the mountability test. The number of other chips mounted on the board was counted as the number of favorable samples in the mountability test.

Table 2 shows the results of the high temperature load test (reliability test) and the mountability test in the first experimental example.

multilayer ceramic capacitor such that the area ratio of Ni/(Ni+Sn) on the surface of the Sn-plated layer was about 0% to about 55% was manufactured as a sample of the second experimental example. Thereafter, an evaluation test of IR (insulation resistance) was performed using the manufactured samples. In addition, a reliability test by a high-temperature load test and a mountability test were performed.

1. Manufacturing of Multilayer Ceramic Capacitors

First, according to the non-limiting example manufacturing method described in the second preferred embodiment, multilayer ceramic capacitors having the following specifications were manufactured as samples of the second experimental example.

Dimensions of multilayer ceramic capacitor: L×W×T=about 1.15 mm× about 0.65 mm× about 0.65 mm
Dielectric layer: $BaTiO_3$
Capacitance: about 4.7 μF
Rated voltage: about 25 V
Base electrode layer: electrode containing conductive metal (Cu) and glass component
Plated layer: 2-layer formation of about 2 μm of Ni-plated layer and about 2 μm of Sn-plated layer
Intermetallic Compounds in Sn-plated layer: $NiSn_4$
Area ratio of Ni/(Ni+Sn) on surface of Sn-plated layer: about 0% to about 55%

Here, in the present experimental example, an intermetallic compound of $Ni_3Sn_4$ having a thickness of about 1 μm was formed at the interface between the Ni-plated layer and the Sn-plated layer except for samples having no intermetallic compound (samples having the area ratio of Ni/(Ni+

TABLE 2

| (Ni/Ni + Sn) AREA RATIO (%) | 0 | 1 | 2 | 3 | 4 | 5 | 10 | 15 | 20 | 25 |
|---|---|---|---|---|---|---|---|---|---|---|
| HIGH TEMPERATURE LOAD TEST NUMBER OF FAILURE SAMPLES | 9/50 | 1/50 | 1/50 | 0/50 | 0/50 | 0/50 | 0/50 | 0/50 | 0/50 | 0/50 |
| MOUNTABILITY TEST NUMBER OF FAVORABLE SAMPLES | 50/50 | 50/50 | 50/50 | 50/50 | 50/50 | 50/50 | 50/50 | 50/50 | 50/50 | 50/50 |

| (Ni/Ni + Sn) AREA RATIO (%) | 30 | 35 | 40 | 45 | 50 | 51 | 52 | 53 | 54 | 55 |
|---|---|---|---|---|---|---|---|---|---|---|
| HIGH TEMPERATURE LOAD TEST NUMBER OF FAILURE SAMPLES | 0/50 | 0/50 | 0/50 | 0/50 | 0/50 | 0/50 | 0/50 | 0/50 | 0/50 | 0/50 |
| MOUNTABILITY TEST NUMBER OF FAVORABLE SAMPLES | 50/50 | 50/50 | 50/50 | 50/50 | 50/50 | 49/50 | 48/50 | 48/50 | 46/50 | 45/50 |

Table 2 shows the number of failure samples in the high-temperature load test (reliability test) and the number of favorable samples in the mountability test for each sample in which the area ratio of Ni/(Ni+Sn) at the surface of the Sn-plated layer were prepared. Samples having the area ratio of Ni/(Ni+Sn) of about 3% or more showed favorable results in the reliability test by the high-temperature load test. Furthermore, samples having the area ratio of Ni/(Ni+Sn) of about 50% or less showed favorable results in the mountability test. From the above, when the area ratio of Ni/(Ni+Sn) on the surface of the Sn-plated layer falls in the range of about 3% to about 50%, it is possible to achieve both high reliability and high mountability. That is, it can be determined that the area ratio of Ni/(Ni+Sn) on the surface of the Sn-plated layer falls in the range of about 3% to about 50% which is a particularly effective range.

Second Experimental Example

According to the non-limiting example manufacturing method described in the second preferred embodiment, a Sn) of 0%). The intermetallic compound of $Ni_3Sn_4$ was formed so as to cover the Ni-plated layer 61.

It should be noted that the area ratio of Ni/(Ni+Sn) on the surface of the Sn-plated layer was adjusted by the same method as in the first experimental example.

2. Evaluation Test of IR (Insulation Resistance)

An evaluation test of IR was performed on the samples of the second experimental example.

For samples of the comparative example, five multilayer ceramic capacitors without including an intermetallic compound (multilayer ceramic capacitors having the area ratio of (Ni/(Ni+Sn)) of 0%) were prepared. The samples for the comparative example had the same or substantially the same structure as those of the Example described below except that those multilayer ceramic capacitors did not include an intermetallic compound.

For samples of the Example, multilayer ceramic capacitors were prepared in which $NiSn_4$ as an intermetallic compound penetrating through the Sn-plated layer in the thickness direction, and $Ni_3Sn_4$ as an intermetallic compound at the interface between the Ni-plated layer and the Sn-plated layer were formed. It should be noted that, in this evaluation test, five samples having the area ratio of Ni/(Ni+Sn) of about 5% were prepared.

The measurements of IR were performed at the three times of before the high-temperature load test, after the high-temperature load test of about 50 hours, and after peeling off the Sn-plated layer after the high-temperature load test of about 50 hours. It should be noted that the deterioration of the IR characteristic due to the hydrogen occlusion can be recovered by peeling off the Sn plating before short circuit. At this time, in order to confirm the effect of hydrogen releasing of the samples of the Example including the intermetallic compound of $NiSn_4$, the measurements of IR were also performed on the samples after peeling off the Sn plating. The test conditions of the evaluation test are shown below.

Test condition for high-temperature load test: about 85° C./25 V/50 hours

Conditions for measuring IR: measuring after heat treatment at about 150° C. for about 1 hour, and allowing to stand at room temperature for about 24 hours Sn plating peeling method: immersing the external electrode coated with Sn plating in "Enstrip TL-015" available from Meltex Inc. for a predetermined time, and peeling off only Sn plating FIG. 13 is a diagram showing the results of evaluation tests of IR in second experimental examples.

The IR values of the chips A, B, C, D, and E, which were the samples of the comparative example, became lower after the high-temperature load test for about 50 hours, than the IR values of them before the high-temperature load test. Thereafter, when the IR values were measured by peeling off the Sn plating, the IR values were recovered to the IR values before the high-temperature load test. On the other hand, the IR values of the chips K, L, M, N, and 0, which were samples of the Example rarely changed from any of the IR values before the high temperature load test, the IR values after the high temperature load test of about 50 hours, and the subsequent IR values after peeling off the Sn plating.

Through this evaluative test, it was confirmed that the samples of the example in which $NiSn_4$ as the intermetallic compound penetrating through the Sn-plated layer in the thickness direction, and $Ni_3Sn_4$ as an intermetallic compound at the interface between the Ni-plated layer and the Sn-plated layer were formed provided advantageous effects in reducing or preventing the deterioration of the IR characteristics due to the hydrogen occlusion as compared with the samples of the comparative example which did not include the intermetallic compound.

3. Reliability Test by High-Temperature Load Test and Mountability Test

The samples of the second experimental example were subjected to a reliability test by a high temperature load test and a mountability test.

In each of the high-temperature load test (reliability test) and the mountability test, 50 samples having different area ratios (refer to Table 1) were prepared, each of which having the area ratio of Ni/(Ni+Sn) in the range of about 0% to about 55%.

In the high-temperature load test, a voltage corresponding to twice the rated voltage was applied to each sample for about 12 hours in an environment in which at least about 20° C. was added to the guaranteed temperature range. As a result, samples in which deterioration such that the resistance value rapidly drops with respect to the initial value occurred were judged as samples having a failure in reliability. More specifically, a voltage of about 50 V corresponding to twice the rated voltage was applied to the samples having the rated voltage of about 25 V for about 12 hours under the above-described temperature environment. As a result, samples whose resistance value dropped to about 1/10 or less of the initial value and samples which stopped operating were judged as samples having a failure in reliability. Then, the number of samples judged as samples having a failure in reliability in the high-temperature load test was counted as the number of failure samples in the high-temperature load test.

It should be noted that, in order to confirm that failure in reliability was attributed to hydrogen occluded in the Ni-plated layer, i.e., in order to confirm that failure in reliability was not attributed to cracks, the following exemplary evaluation was performed.

Each of the samples judged as failure in reliability was polished after being solidified with a resin, and the cross section of the polished sample was observed to confirm whether or not cracks were present in the capacitor active portion. Here, if no crack was found in the capacitor active portion, the sample was determined as failure in reliability in view of the decrease in reliability due to hydrogen occluded in the Ni-plated layer. The specific exemplary evaluation method is as follows.

First, the first end surface or the second end surface of the multilayer ceramic capacitor solidified with a resin is polished so as to be parallel or substantially parallel to the first end surface or the second end surface. Here, when polishing is started from the first end surface, the confirmation of the presence or absence of cracks is started from a position where a tip, which is in the vicinity of the first end surface, of the internal electrode of the second internal electrode exposed at the second end surface begins to emerge. Thereafter, the confirmation of the presence or absence of cracks continues until the position where the tip vanishes, which is in the vicinity of the second end surface, of the internal electrode of the first internal electrode exposed at the first end surface while advancing polishing to the second end surface, i.e., until the first internal electrode is no longer confirmed. It should be noted that, in the results of the confirmation at this time, cracks were not confirmed in the samples having a failure in reliability shown in Table 3 below. Therefore, it was determined that a failure in reliability in the samples having a failure in reliability in Table 3 below was attributed to hydrogen occluded in the Ni-plated layer.

In the mountability test, evaluation was carried out by mountability test using a mounter.

First, a cover tape was peeled off from an embossed tape in which the multilayer ceramic capacitors as samples of the experimental example were packaged. Thereafter, the multilayer ceramic capacitors were suctioned using the nozzle of a mounter mounting machine. It should be noted that, in consideration of the chip size of the multilayer ceramic capacitor, a nozzle having an appropriate suction diameter was selected. After suctioning with the nozzle, the multilayer ceramic capacitors were mounted on the board. After the mounting operation, the number of chips detached from the board was counted as the number of failure samples in the mountability test. The number of other chips mounted on the board was counted as the number of favorable samples in the mountability test.

Table 3 shows the results of the high temperature load test (reliability test) and the mountability test in the second experimental example.

TABLE 3

| (Ni/Ni + Sn) AREA RATIO (%) | 0 | 1 | 2 | 3 | 4 | 5 | 10 | 15 | 20 | 25 |
|---|---|---|---|---|---|---|---|---|---|---|
| HIGH TEMPERATURE LOAD TEST NUMBER OF FAILURE SAMPLES | 9/50 | 1/50 | 0/50 | 0/50 | 0/50 | 0/50 | 0/50 | 0/50 | 0/50 | 0/50 |
| MOUNTABILITY TEST NUMBER OF FAVORABLE SAMPLES | 50/50 | 50/50 | 50/50 | 50/50 | 50/50 | 50/50 | 50/50 | 50/50 | 50/50 | 50/50 |

| (Ni/Ni + Sn) AREA RATIO (%) | 30 | 35 | 40 | 45 | 50 | 51 | 52 | 53 | 54 | 55 |
|---|---|---|---|---|---|---|---|---|---|---|
| HIGH TEMPERATURE LOAD TEST NUMBER OF FAILURE SAMPLES | 0/50 | 0/50 | 0/50 | 0/50 | 0/50 | 0/50 | 0/50 | 0/50 | 0/50 | 0/50 |
| MOUNTABILITY TEST NUMBER OF FAVORABLE SAMPLES | 50/50 | 50/50 | 50/50 | 50/50 | 50/50 | 49/50 | 48/50 | 48/50 | 46/50 | 45/50 |

Table 3 shows the number of NG samples in the high temperature load test (reliability test) and the number of OK samples in the mountability test in each sample prepared with the area ratio of Ni/(Ni+Sn) on the surface of the Sn-plated layer were prepared. Samples having the area ratio of Ni/(Ni+Sn) of about 2% or more showed favorable results in the reliability test by the high-temperature load test. Furthermore, samples having the area ratio of Ni/(Ni+Sn) of about 50% or less showed favorable results in the mountability test. From the above, when the area ratio of Ni/(Ni+Sn) on the surface of the Sn-plated layer falls in the range of about 2% to about 50%, it is possible to achieve both high reliability and high mountability. As described above, in the second experimental example, the range of the area ratio which is particularly effective is extended from about 2% to about 50%.

As described above, it is confirmed as an advantageous effect in that, when heat treatment was performed at a temperature of about 130° C. or higher for about 1 hour or more after heat treatment at about 90° C., the number of failure samples in the reliability test under a high-temperature load environment was reduced, while the results of the mountability test after mounting the board remained unchanged. It is considered that $Ni_3Sn_4$ was formed at the interface between the Ni-plated layer and the Sn-plated layer through the heat treatment at about 130° C. or higher, such that the hydrogen releasing efficiency was improved.

According to the results of the first experimental example and the second experimental example, it is possible for the multilayer ceramic capacitor 1 according to preferred embodiments of the present invention to reduce or prevent the deterioration of the insulating resistance characteristic while reducing or preventing moisture infiltration into the capacitor.

As described above, the multilayer ceramic capacitor 1 according to preferred embodiments of the present invention includes the intermetallic compounds 622 that penetrate through the Sn-plated layer 62 in the thickness direction and hydrogen to pass therethrough more easily than Sn. More specifically, each of the intermetallic compounds 622 that allow hydrogen to pass therethrough more easily than Sn extends from the surface of the Ni-plated layer 61 to the outer surface of the Sn-plated layer 62 in the Sn-plated layer 62. Here, since the intermetallic compound 622 that allows hydrogen to pass therethrough more easily than Sn each enable permeation of hydrogen from the surface of the Ni-plated layer 61 to the outer surface of the Sn-plated layer 62, it is possible to release the hydrogen occluded in the Ni-plated layer 61 to the outside of the multilayer ceramic capacitor 1. Therefore, it is possible to reduce or prevent the deterioration of the insulation resistance characteristics of the multilayer ceramic capacitor 1. Furthermore, the intermetallic compound 622 that allows hydrogen to pass therethrough more easily than Sn is crystals in which Sn in the Sn-plated layer 62 and Ni diffused in the Sn-plated layer 62 are rearranged at a constant composition, and thus, can be maintained as a film structure at a constant thickness of the Sn-plated layer 62. Therefore, it is possible to reduce or prevent moisture infiltration into the end surface or the like of the multilayer body 10 into the capacitor. Furthermore, it is possible to maintain favorable mountability of the multilayer ceramic capacitor 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of laminated dielectric layers, a first main surface and a second main surface opposing each other in a height direction, a first side surface and a second side surface opposing each other in a width direction perpendicular or substantially perpendicular to the height direction, and a first end surface and a second end surface opposing each other in a length direction perpendicular or substantially perpendicular to the height direction and the width direction;
   first internal electrode layers on the plurality of dielectric layers and exposed at the first end surface;
   second internal electrode layers on the plurality of dielectric layers and exposed at the second end surface;
   a first external electrode connected to the first internal electrode layers and provided on the first end surface; and
   a second external electrode connected to the second internal electrode layers and provided on the second end surface; wherein
   the first external electrode and the second external electrode each include a Ni-plated layer and a Sn-plated layer on the Ni-plated layer;
   the Sn-plated layer includes an intermetallic compound that penetrates through the Sn-plated layer in a thickness direction and allows hydrogen to pass therethrough more easily than Sn; and
   the intermetallic compound is $NiSn_4$.

2. The multilayer ceramic capacitor according to claim 1, wherein the first external electrode and the second external electrode each include a base electrode layer between the multilayer body and the Ni-plated layer.

3. The multilayer ceramic capacitor according to claim 2, wherein the base electrode layer is one of a fired layer, a conductive resin layer, and a thin film layer.

4. The multilayer ceramic capacitor according to claim 2, wherein the base electrode layer is a fired layer including a metal component and at least one of a glass component and a ceramic component.

5. The multilayer ceramic capacitor according to claim 4, wherein the metal component includes at least one of Cu, Ni, Ag, Pd, a Ag—Pd alloy, or Au.

6. The multilayer ceramic capacitor according to claim 4, wherein the glass component includes at least one of B, Si, Ba, Mg, Al, or Li.

7. The multilayer ceramic capacitor according to claim 4, wherein the ceramic component includes at least one of $BaTiO_3$, $CaTiO_3$, $(Ba, Ca)TiO_3$, $SrTiO_3$, or $CaZrO_3$.

8. The multilayer ceramic capacitor according to claim 1, wherein an intermetallic compound of $Ni_3Sn_4$ is provided at an interface between the Ni-plated layer and the Sn-plated layer on the Ni-plated layer.

9. The multilayer ceramic capacitor according to claim 1, wherein an area ratio of Ni/(Ni+Sn) when a surface of the Sn-plated layer is analyzed by wavelength dispersive X-ray analysis (WDX) is about 3% or more and about 50% or less.

10. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

11. The multilayer ceramic capacitor according to claim 10, wherein each of the plurality of dielectric layers further includes at least one a Mn compound, an Fe compound, a Cr compound, a Co compound, or a Ni compound as a secondary component.

12. The multilayer ceramic capacitor according to claim 1, wherein a thickness of each of the plurality of dielectric layers is about 0.8 μm or more and about 10 μm or less.

13. The multilayer ceramic capacitor according to claim 1, wherein a number of the plurality of dielectric layers is 15 or more and 800 or less.

14. The multilayer ceramic capacitor according to claim 1, wherein each of the first and second internal electrode layers includes at least one of Ni, Cu, Ag, Pd, Au, or an alloy including at least one of Ni, Cu, Ag, Pd, or Au.

15. The multilayer ceramic capacitor according to claim 1, wherein a thickness of each of the first and second internal electrode layers is about 0.2 μm or more and 2.0 μm or less.

16. The multilayer ceramic capacitor according to claim 1, wherein a total number of the first and second internal electrode layers is 15 or more and 800 or less.

17. The multilayer ceramic capacitor according to claim 1, wherein the intermetallic compound has a substantially flat shape.

18. The multilayer ceramic capacitor according to claim 1, wherein
a surface of the Ni-plated layer includes irregularities; and
the intermetallic compound of $NiSn_4$ is provided at tops or in a vicinity of the tops of convex portions included in the surface of the Ni-plated layer and extends to a surface of the Sn-plated layer.

19. The multilayer ceramic capacitor according to claim 1, wherein an arithmetic average roughness of a surface of the Ni-plated layer is about 0.1 μm or more and about 0.5 μm or less.

20. The multilayer ceramic capacitor according to claim 1, wherein the intermetallic compound has a needle shape.

* * * * *